US008886851B2

(12) United States Patent
Cain et al.

(10) Patent No.: US 8,886,851 B2
(45) Date of Patent: Nov. 11, 2014

(54) METHOD OF MONITORING A PORTABLE ELECTRONIC DEVICE AND A SERVER FOR MONITORING SAME

(71) Applicant: Absolute Software Corporation, Vancouver (CA)

(72) Inventors: Fraser Cain, Vancouver (CA); Christian Cotichini, Vancouver (CA); Thanh Cam Nguyen, Vancouver (CA)

(73) Assignee: Absolute Software Corporation, Vancouver, BC (CA)

( * ) Notice: Subject to any disclaimer, the term of this patent is extended or adjusted under 35 U.S.C. 154(b) by 0 days.

(21) Appl. No.: 14/015,950

(22) Filed: Aug. 30, 2013

(65) Prior Publication Data

US 2014/0075584 A1 Mar. 13, 2014

Related U.S. Application Data

(63) Continuation of application No. 13/108,940, filed on May 16, 2011, now Pat. No. 8,606,971, which is a continuation of application No. 10/263,462, filed on Oct. 2, 2002, now Pat. No. 7,945,709, which is a continuation of application No. 09/041,112, filed on Mar. 11, 1998, now Pat. No. 6,507,914, which is a continuation of application No. 08/558,432, filed on Nov. 15, 1995, now Pat. No. 5,764,892, which is a continuation-in-part of application No. 08/339,978, filed on Nov. 15, 1994, now Pat. No. 5,715,174.

(51) Int. Cl.
| | |
|---|---|
| *G06F 3/00* | (2006.01) |
| *G06F 11/30* | (2006.01) |
| *G01S 3/02* | (2006.01) |
| *G06F 13/12* | (2006.01) |
| *H04L 12/24* | (2006.01) |
| *H04L 12/26* | (2006.01) |
| *G06F 21/73* | (2013.01) |
| *G01S 1/02* | (2010.01) |
| *G06F 21/88* | (2013.01) |
| *G06F 12/14* | (2006.01) |
| *G06F 21/31* | (2013.01) |
| *H04W 12/12* | (2009.01) |

(52) U.S. Cl.
CPC .......... *G06F 12/1408* (2013.01); *G06F 13/126* (2013.01); *H04L 41/28* (2013.01); *H04L 43/0817* (2013.01); *G06F 21/73* (2013.01); *H04W 12/12* (2013.01); *G06F 2221/2111* (2013.01); *H04L 41/046* (2013.01); *G01S 1/02* (2013.01); *G06F 21/88* (2013.01); *G06F 21/313* (2013.01)
USPC ................ 710/15; 710/19; 713/190; 342/450

(58) Field of Classification Search
CPC ......... G01S 19/00; G01S 5/02; G01S 5/0252; H04W 64/00; G06F 21/72; G06F 13/385
USPC .......................... 710/15, 19; 713/190; 342/450
See application file for complete search history.

(56) References Cited

U.S. PATENT DOCUMENTS

| | | | | |
|---|---|---|---|---|
| 5,003,317 A | * | 3/1991 | Gray et al. | ..................... 342/457 |
| 5,223,844 A | * | 6/1993 | Mansell et al. | .......... 342/357.31 |
| 5,563,453 A | * | 10/1996 | Nyfelt | .......................... 307/10.2 |

*Primary Examiner* — Alan Chen
(74) *Attorney, Agent, or Firm* — Liu & Liu

(57) ABSTRACT

A system for locating and monitoring electronic devices utilizing a security system that is secretly and transparently embedded within the computer. This security system causes the client computer to periodically and conditionally call a host system to report its serial number via an encoded series of dialed numbers. A host monitoring system receives calls from various clients and determines which calls to accept and which to reject by comparing the decoded client serial numbers with a predefined and updated list of numbers corresponding to reported stolen computers. The host also concurrently obtains the caller ID of the calling client to determine the physical location of the client computer. The caller ID and the serial number are subsequently transmitted to a notifying station in order to facilitate the recovery of the stolen device. The security system remains hidden from the user, and actively resists attempts to disable it.

20 Claims, 18 Drawing Sheets

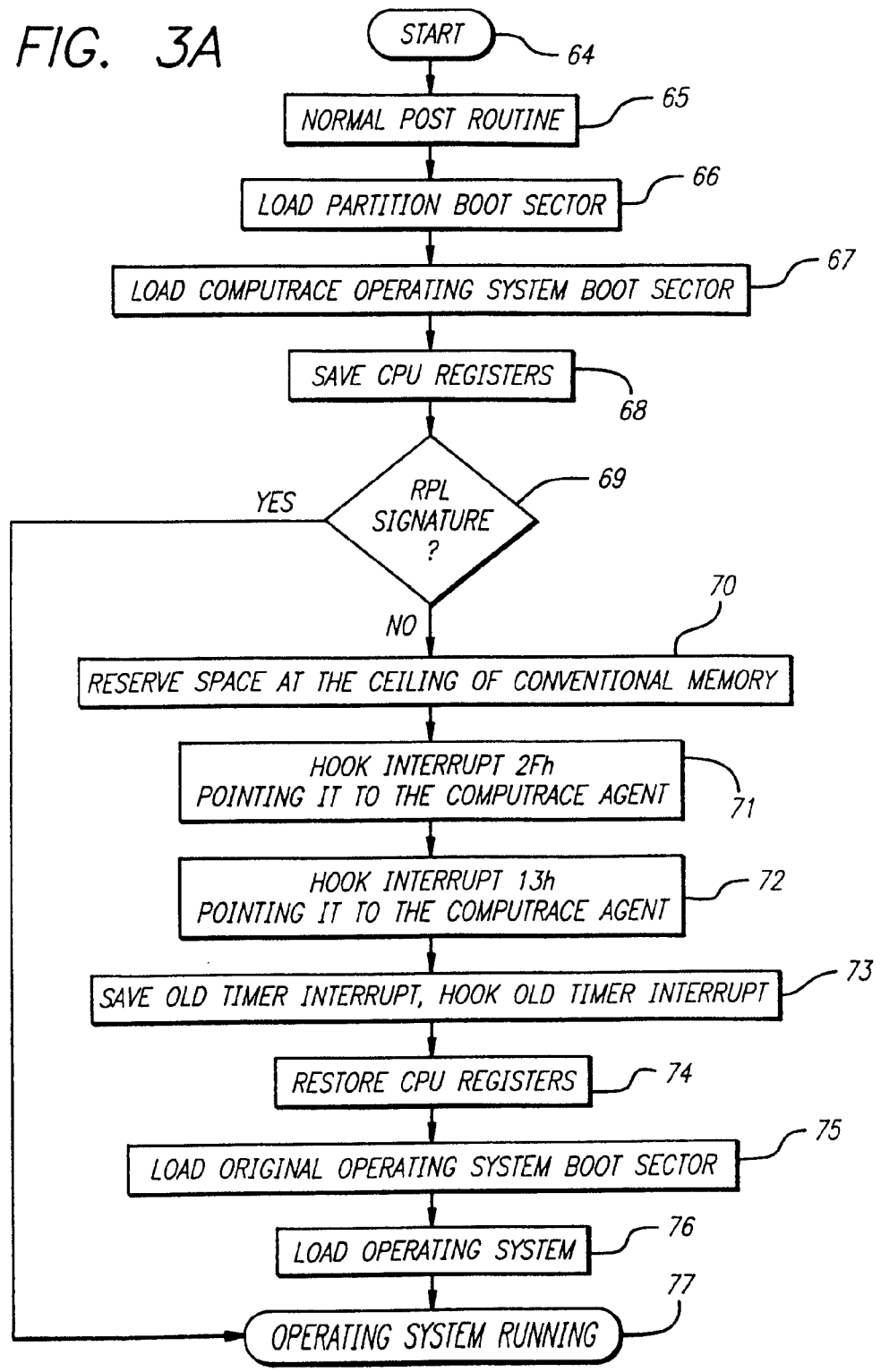

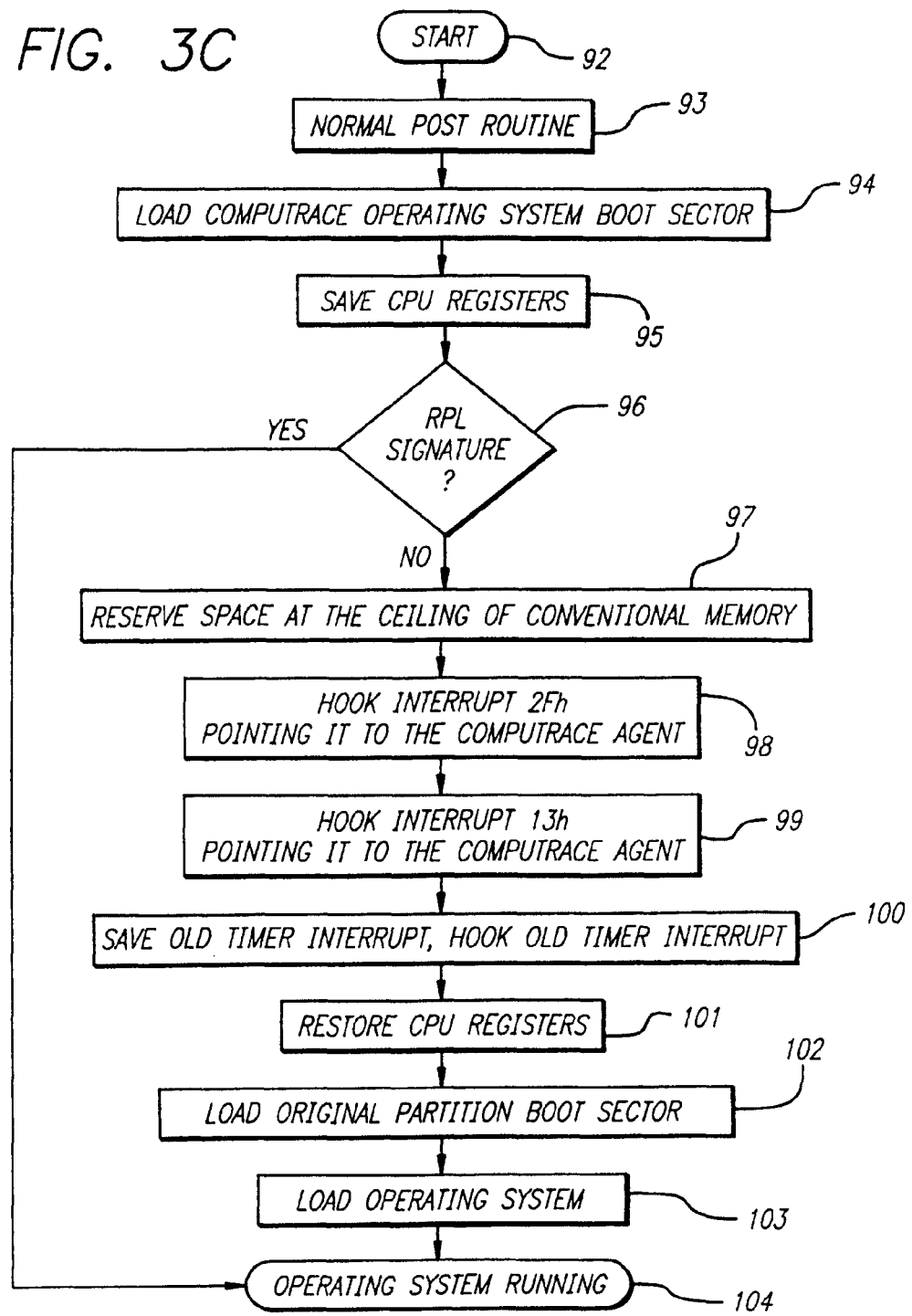

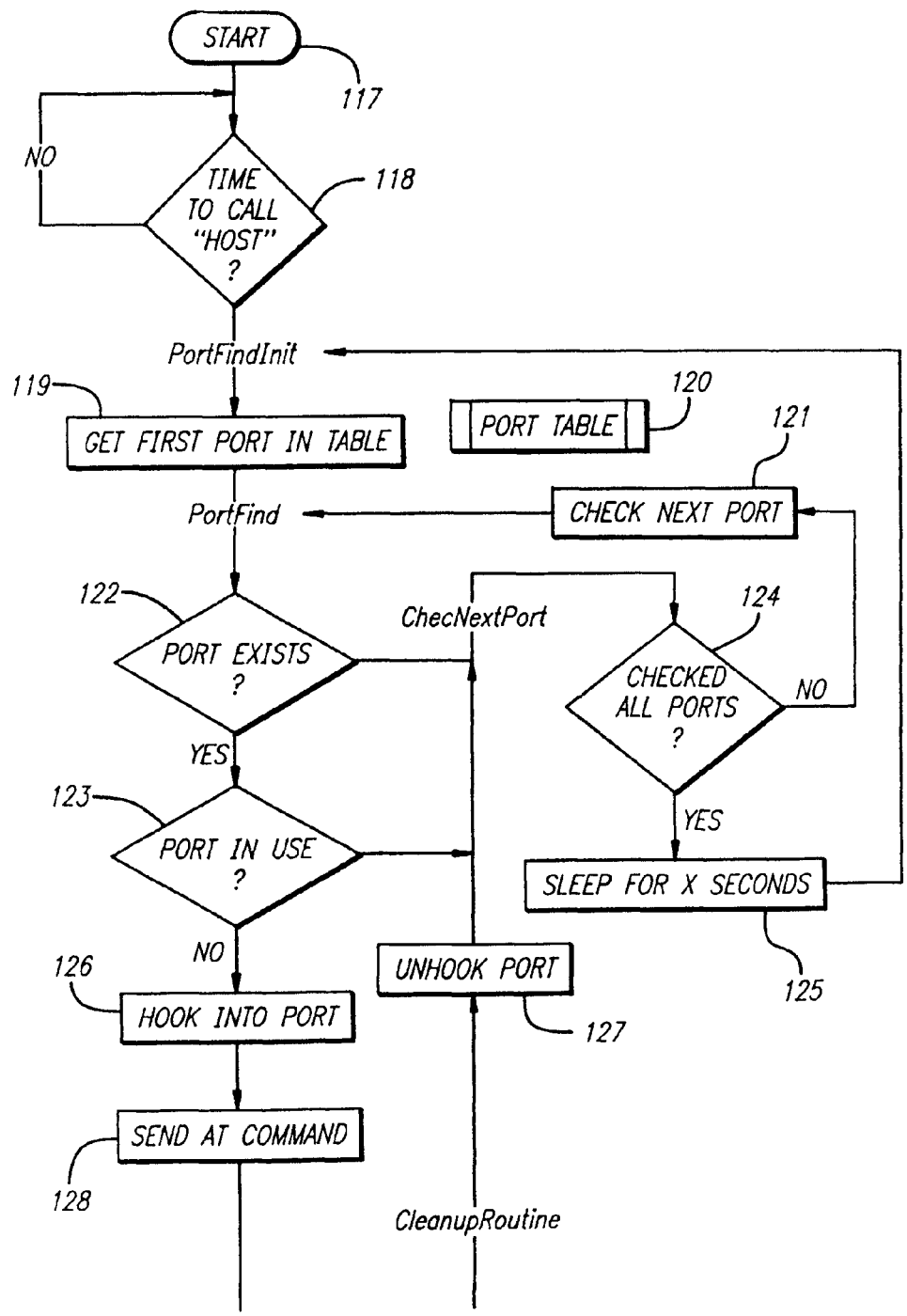
FIG. 3E(1)

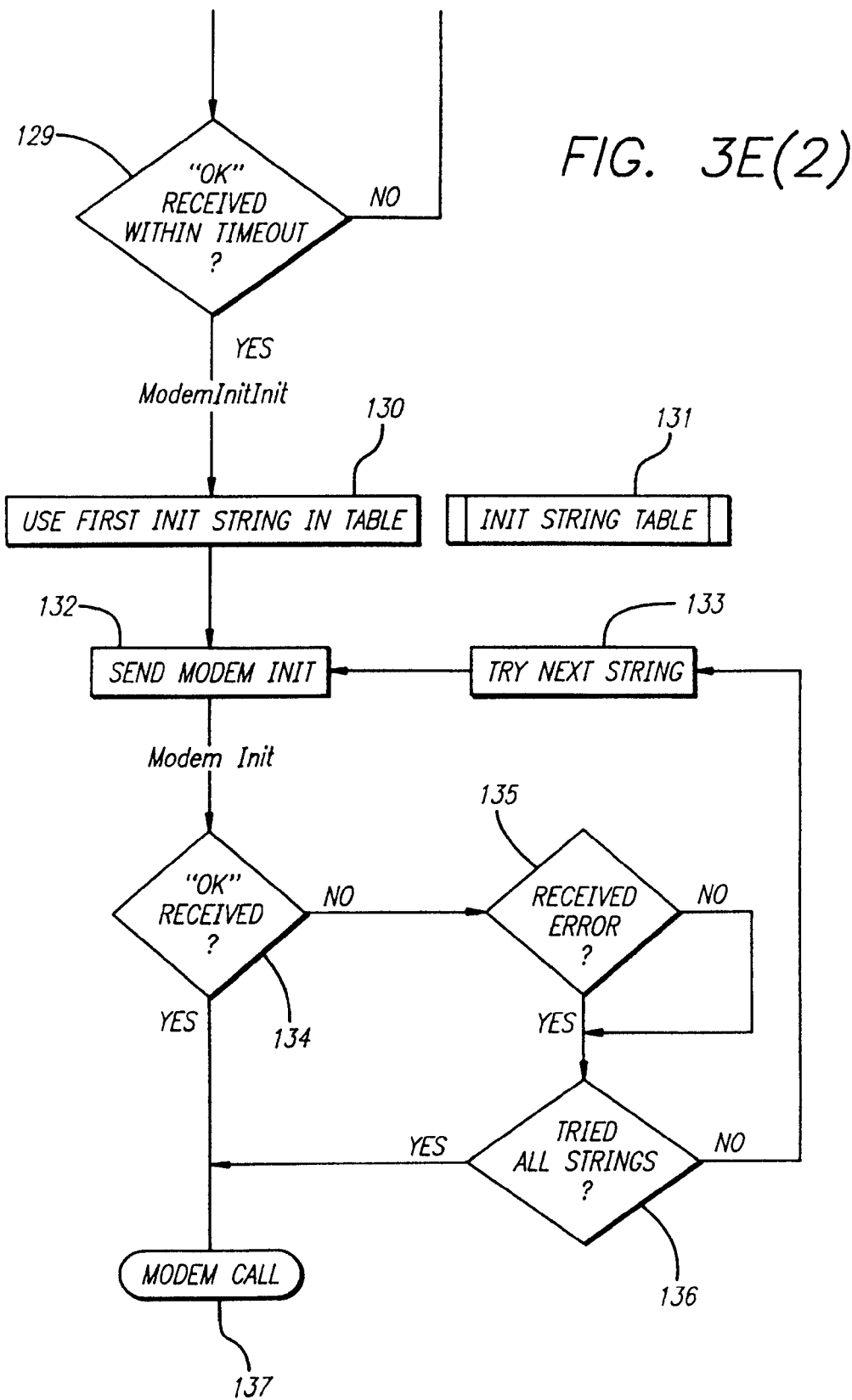
FIG. 3E(2)

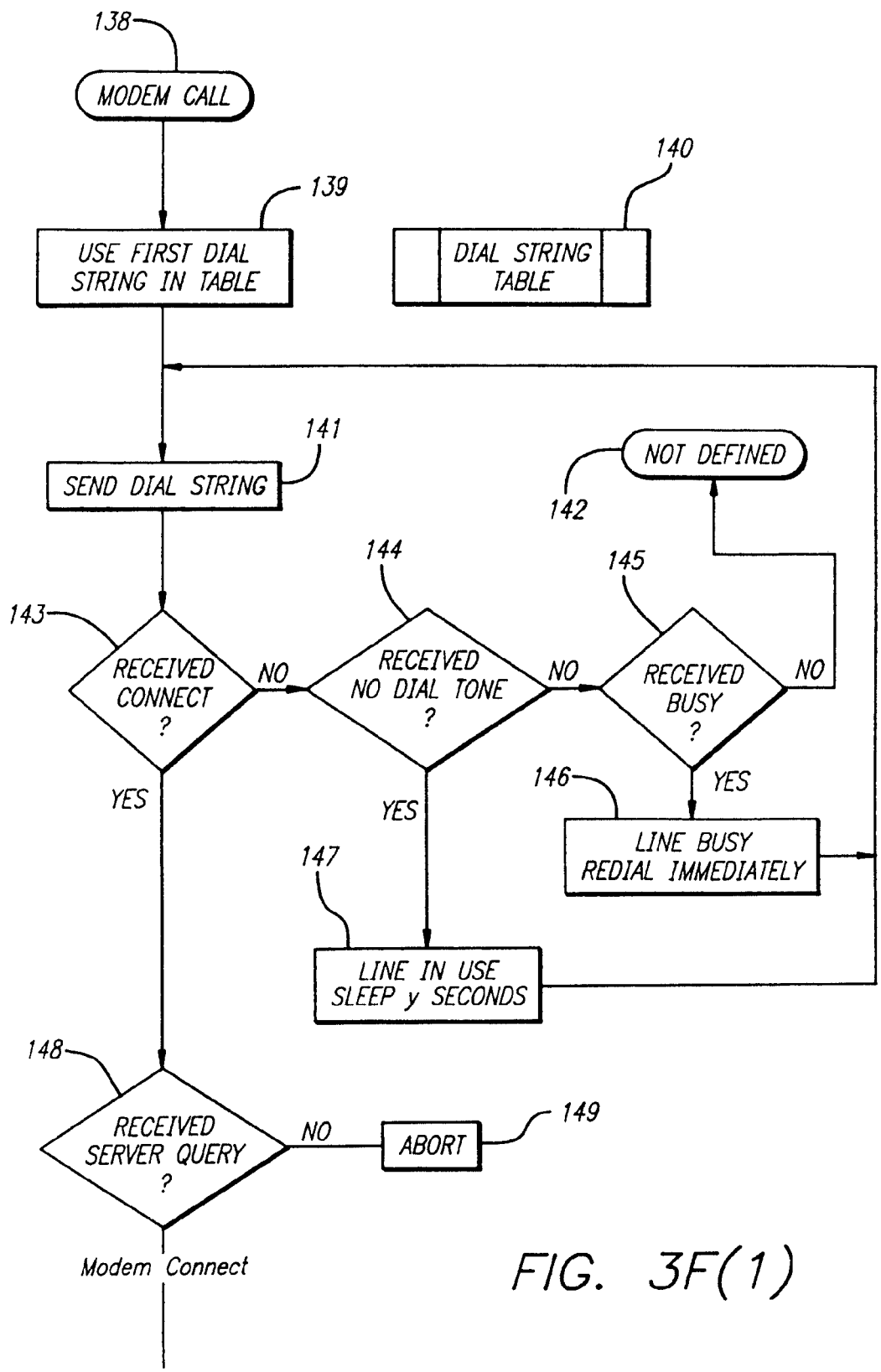
FIG. 3F(1)

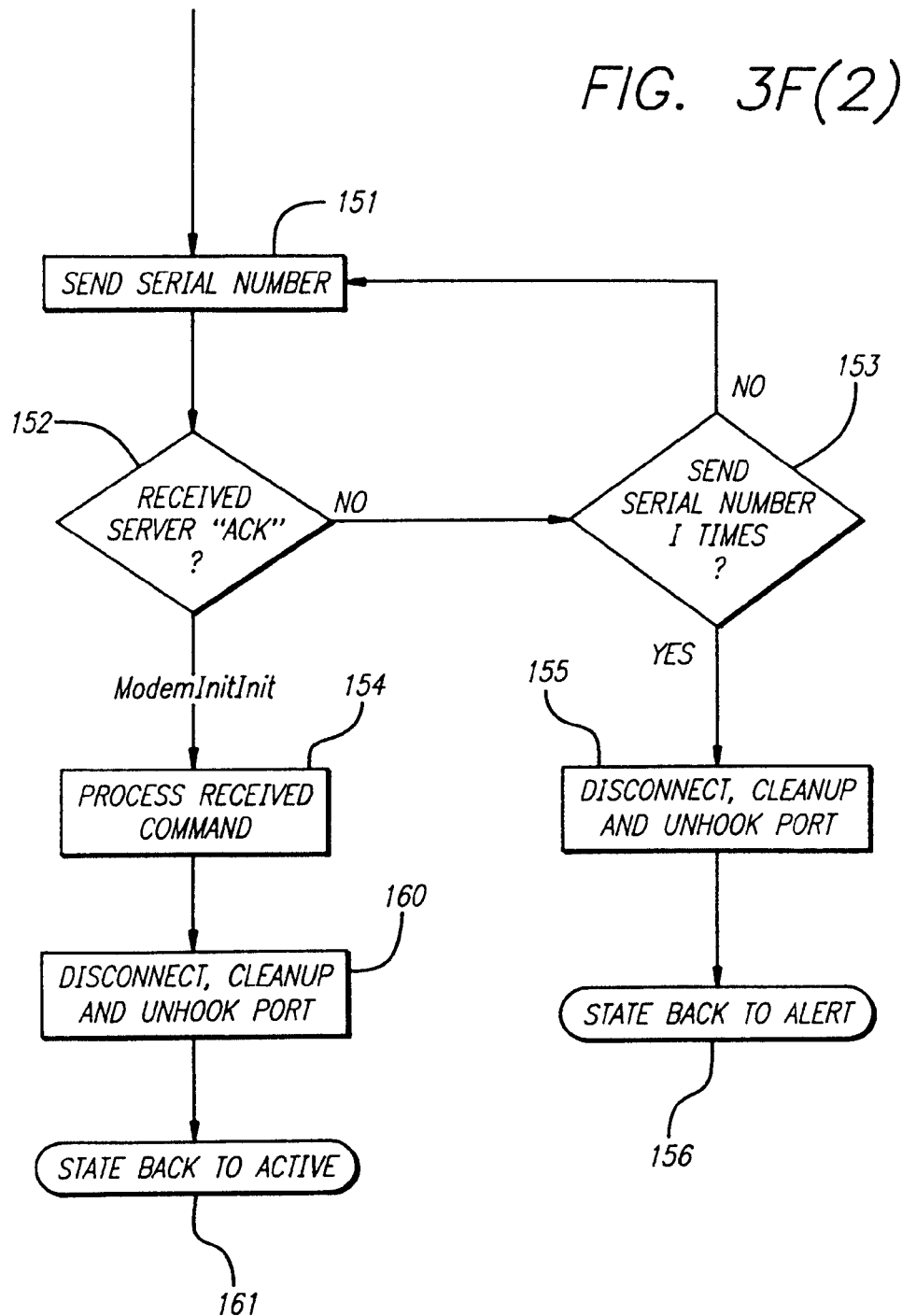
FIG. 3F(2)

METHOD OF MONITORING A PORTABLE ELECTRONIC DEVICE AND A SERVER FOR MONITORING SAME

This is a Continuation of co-pending U.S. patent application Ser. No. 13/108,940, filed May 16, 2011, which is a Continuation of U.S. patent application Ser. No. 10/263,462, filed Oct. 2, 2002 (now U.S. Pat. No. 7,945,709), which is a Continuation of U.S. patent application Ser. No. 09/041,112, filed Mar. 11, 1998 (now U.S. Pat. No. 6,507,914), which is a Continuation of U.S. patent application Ser. No. 08/558,432, filed Nov. 15, 1995 (now U.S. Pat. No. 5,764,892), which is a Continuation-in-Part of U.S. patent application Ser. No. 08/339,978, filed Nov. 15, 1994 (now U.S. Pat. No. 5,715,174); these applications are fully incorporated by reference as if fully set forth herein.

BACKGROUND OF THE INVENTION

Many electronic devices, such as laptop computers and cellular telephones, are becoming more compact and portable. While such portability is extremely convenient for the user, it has given rise to an increased risk of theft. These electronic devices are often very expensive and are easily lost or stolen.

Previously, attempts have been made to provide means for retrieving lost or stolen items of various types. The simplest approach is marking the item with the name and the address of the owner, or some other identification such as a driver's license number. If the item falls into the hands of an honest person, then the owner can be located. However, this approach may not deter a thief who can remove visible markings on the device.

Password protection schemes are of dubious value in discouraging theft or retrieving an item. Although the data can be protected from theft, the computer hardware cannot be found or retrieved.

Another approach has been to place a radio transmitter on the item. This has been done in the context of automobile anti-theft devices. The police or a commercial organization monitors the applicable radio frequency to try to locate a stolen vehicle. This method is not suitable for smaller items such as cellular telephones or laptop computers. First, it is inconvenient to disassemble such devices in order to attempt to install a transmitter therein. Second, there may not be any convenient space available to affix such a transmitter. Furthermore, a rather elaborate monitoring service, including directional antennas or the like, is required to trace the source of radio transmissions.

It is therefore an object of the invention to provide an improved means for tracing or locating smaller lost or stolen objects, particularly laptop computers, cellular telephones, desktop computers and other small, portable electronic devices or expensive home and office electronic equipment.

It is also an object of the invention to provide an improved means for tracing such electronic devices which can be installed without disassembly or physical alteration of the devices concerned.

It is a further object of the invention to provide an improved means for locating lost or stolen items, this means being hidden from unauthorized users in order to reduce the risk of such means being disabled by the unauthorized user.

It is a still further object of the invention to provide an improved means for locating lost or stolen items which actively resist attempts to disable the means by an unauthorized user.

It is a still further object of the invention to provide an improved means for inexpensively and reliably locating lost or stolen items.

The invention overcomes disadvantages associated with the prior art by yielding a security device for small computers, cellular telephones or the like which can be programmed onto existing memory devices such a devices, hard disks or the like. Accordingly, no physical alteration is necessary or apparent to a thief. The existence of the security device is well cloaked and it cannot be readily located or disabled even if the possibility of its existence is suspected. Apparatuses and methods according to the invention can be very cost effective, requiring relatively inexpensive modifications to software or hardware and operation of relatively few monitoring devices.

SUMMARY OF THE INVENTION

This invention, Electronic Article Surveillance System, relates to a security apparatus and method for retrieving lost or stolen electronic devices, such as portable computers. This invention enables electronic articles to be surveyed or monitored by implanting an intelligent Agent with a pre-defined task set onto an electronic device. This Agent communicates with a preselected Host Monitoring System which is capable of multiple services including; tracing location, identifying the serial number, and electronically notifying the end user/owner of its location. The Agent hides within the software/firmware/hardware of the electronic device, and operates without interfering with the regular operation of the device. The Agent is designed to evade detection and resist possible attempts to disable it by an unauthorized user.

According to one aspect of the invention there is provided an electronic device with an integral security system. The security system includes means for sending signals to a remote station at spaced apart intervals of time. The signals including identifying indicia for the device. Preferably, the means for sending signals includes a telecommunications interface connectable to a telecommunications system, and means for dialing a preselected telecommunications number. The remote station includes a telecommunications receiver having said preselected telecommunications number.

Where the electronic device is a computer, the means for sending signals includes means for providing signals to the telecommunication interface to dial the preselected telecommunication number and send the identifying indicia. The telecommunication interface may include a modem. The means for providing signals may include security software programmed on the computer.

The Agent security system may be recorded on the boot sector of a hard disk or, alternatively, on a hidden system file such as IO.SYS, MSDOS.SYS, IBMBIO.COM or IBMDOS.COM.

There is provided according to another aspect of the invention a method for tracing lost or stolen electronic devices whereby a telecommunications interface is connectable to a telecommunications system at a first telecommunications station. The method includes providing the electronic device with means for sending signals to the telecommunications interface. The means is instructed by the program to send first signals to the telecommunications interface which dials a remote telecommunications station. These first signals contain the encoded identification (serial number) of the sending computer. The telecommunications interface then dials a remote telecommunications station corresponding to the intended receiving computer. Upon detecting a ring signal, the remote computer retrieves the caller phone number and the identification of the sending computer from the telephone company. The remote computer decodes the serial number of the sending computer, and compares it with a predefined listing of serial numbers of lost or stolen computers. The call will only be answered if the sending computer is on the predefined list.

In an alternative embodiment, if the remote computer answers the ring then the means for sending signals automatically sends second signals to the telecommunications interface, which transmits to the remote telecommunications station identifying indicia for the device as well as any other pertinent information.

There is provided according to another aspect of the invention a method for encoding the serial number of the sending computer within a sequential series of dialed numbers. In this method, a predetermined digit within the dialed number sequence corresponds to one of the digits of the serial number. The preceding digit within the encoded signal indicates which digit within the serial number sequence that the predetermined digit represents.

BRIEF DESCRIPTION OF THE DRAWINGS

These and other objects and advantages will become apparent by reference to the following detailed description and accompanying drawings, in which:

FIG. 3A is a flowchart showing a method for startup loading of an Agent security system according to an embodiment of the invention wherein the operating system boot sector is loaded with the Agent.

FIG. 3C is a flowchart similar to FIGS. 3A and 3B wherein the partition boot sector is modified to be loaded with the Agent.

FIGS. 3E(1), 3E(2), 3F(1) and 3F(2) are portions of a flowchart showing the Agents' work cycle apparatus and method according to an embodiment of the invention.

DESCRIPTION OF THE PREFERRED EMBODIMENTS

System Overview

Figure 1:
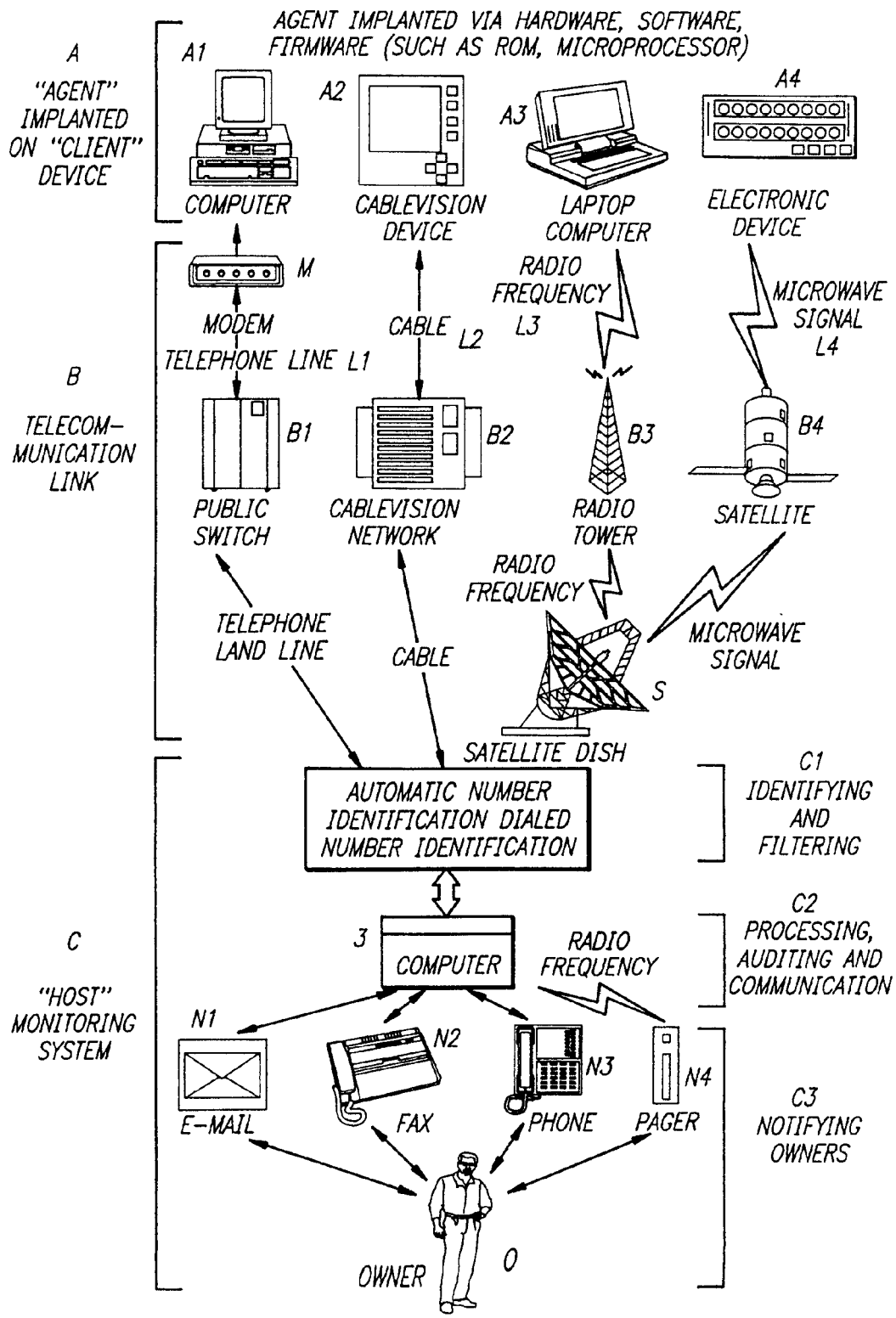
FIG. 1 is a functional block diagram of the Electronic Article Surveillance System in accordance with the teachings of this invention.

Referring to FIG. 1, the Electronic Article Surveillance System is comprised of three main components: (1) Client device A consisting of any electronic device which has been implanted with the Agent; (2) A telecommunication link B such as a switched communications system, cable networks, radio/microwave signal; and (3) The host monitoring system C which controls the communications between the client device A and the host monitoring system C.

Referring to FIG. 1, the client device can be a cablevision device A2, laptop computer A3, or other type of electronic device A4. However, for illustrative purposes, the client device consists of a computer A1 attached to modem M. The host monitoring system C sends and receives data packets from the client computer 10 over a suitable bi-directional transmission medium, such as a common telephone line L1. Telephone line L1 couples the client device C to the host monitoring system C, and the host computer 3, through Public Switch B1 (telephone company). The host monitoring system C notifies the appropriate parties C3 (owner O, law enforcement agency, or monitoring company) of the status of the client device A via suitable communication means such as electronic mail N1, fax N2, telephone N3 or pager N4. Host monitoring system C also identifies and filters incoming calls C1, and also provides processing, auditing and communication functions C2

In another embodiment of the invention cablevision device A2 is connected to cablevision network B2 via cable L2. This cable L2 further connects cablevision network L2 to the host monitoring system C.

In another embodiment of the invention laptop computer A3 is connected to radio tower B3 via radio frequency (RF) transmissions L3. These RF transmissions are received by satellite dish S at the host monitoring system C.

In yet another embodiment of the invention electronic device A4 is connected to satellite B4 via microwave signal L4. Microwave signal L4 further connects satellite B4 to satellite dish S at the host monitoring system C.

Figure 2:
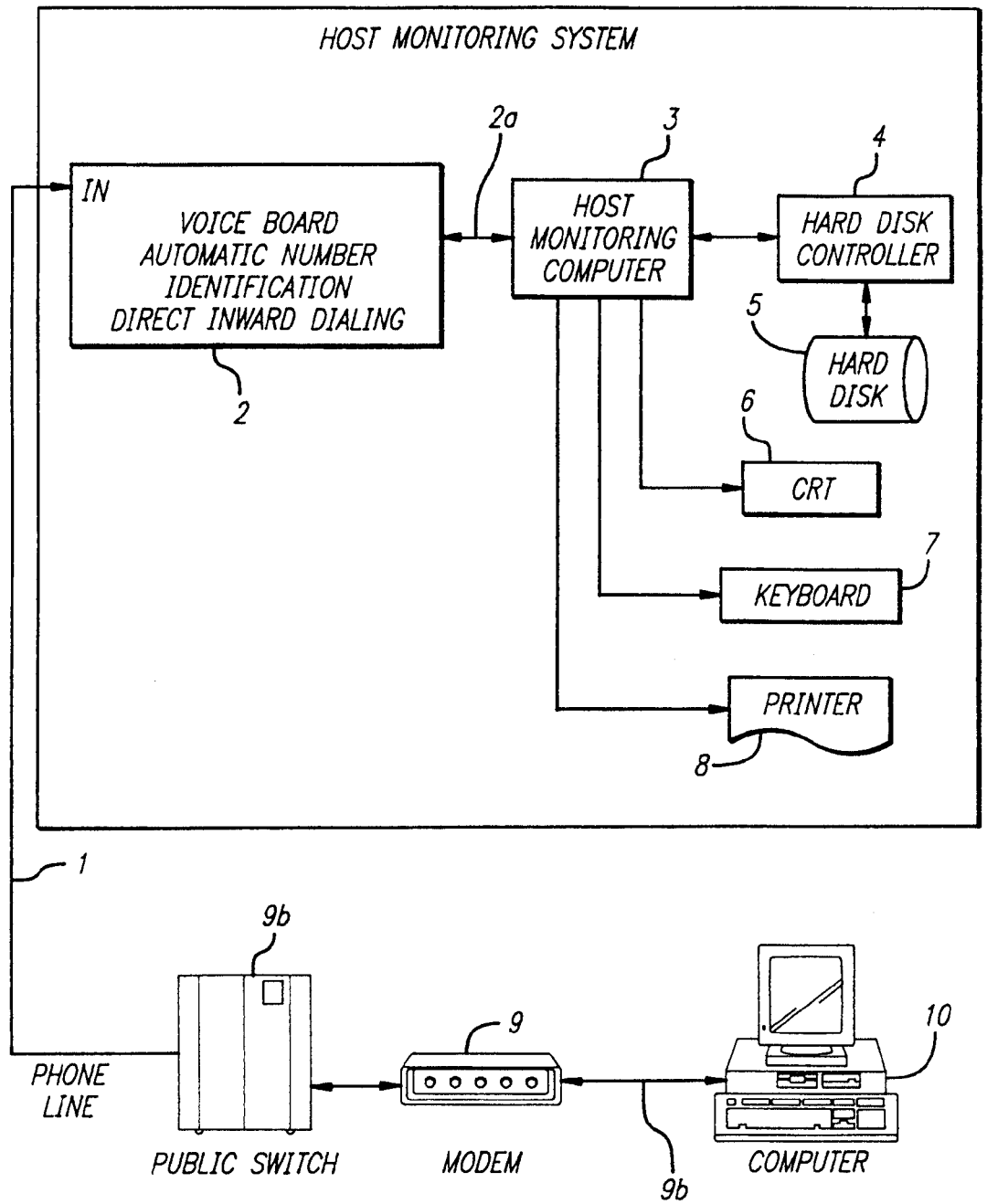
FIG. 2 is a simplified illustration of FIG. 1 for the purpose of showing an illustrative embodiment of the present invention.

Referring to FIG. 2, the Host Monitoring system C is comprised of a Voice Board 2, Host Monitoring Computer 3, Hard Disk Controller 4, Hard Disk 5, CRT 6, Keyboard 7, and Printer 8. The host monitoring computer 3 is coupled to a suitable display device, such as a CRT monitor 6, keyboard 7, and to printer 8. The keyboard 7 permits the operator to interact with the Host Monitoring System C. For example, the operator may use keyboard 7 to enter commands to print out a log file of the clients that have called into the system. The host computer 3 illustratively takes the form of an IBM personal computer. The source codes for the host monitoring system C, in Visual C++ by MicroSoft, are attached in the Appendix.

Telephone line 1 is connected to the computer 3 by a voice board 2 adapted to receive and recognize the audible tones of both caller ID and dialed numbers transmitted via the telephone line 1. Client computer 10 is connected to modem 9 via serial ports 9a. Host computer 3 is connected to voice board 2 via serial port 2a. The modem 9 and voice board 2 are connected to telephone line 1 which is routed through public switch 9b in accordance with a conventional telephone system. Computer 10 and modem 9 form a first telecommunication station, while computer 3 and voice board 2 form a second, or remote telecommunications system. The Host Monitoring System C sends and receives data packets from client computer 10.

Ring signals are received on phone line 1 as an input to voice board 2. In an illustrative embodiment of the invention, voice board 2 may take the form of the DID/120, DTI/211 and D/12X Voice boards manufactured by Dialogic Corporation. The voice board 2 is coupled to host computer 3 via data bus 2a. The voice board 2 is operative to recognize the ring signal. Then it receives the caller ID and dialed numbers and converts them into corresponding digital signals. Host computer 3 uses these signals for comparison against a list stored in hard disk 5.

In an illustrative embodiment of the invention, the hard disk controller 4 may comprise memory control boards manufactured by Seagate Tech under the designation Hard Disk Controller. The hard disk controller 4 is particularly suitable to control the illustrative embodiment of the hard disk memory 5 manufactured by Seagate Tech under their designation ST-251.

The Agent is a terminated and stay resident program which is installed on hardware, software, or firmware. The alternative methods of installation are described in detail in FIGS. 3A, 3B, 3C, and 3D. Once the Agent is installed it will report its identity and its location to the host after specified periods of time have elapsed, and upon the occurrence of certain predetermined conditions. This is further illustrated in FIG. 2A. Client source codes are disclosed, in Tazam Assembler Code by Borland, in the Appendix.

Installing and Loading the Agent

Figure 3:
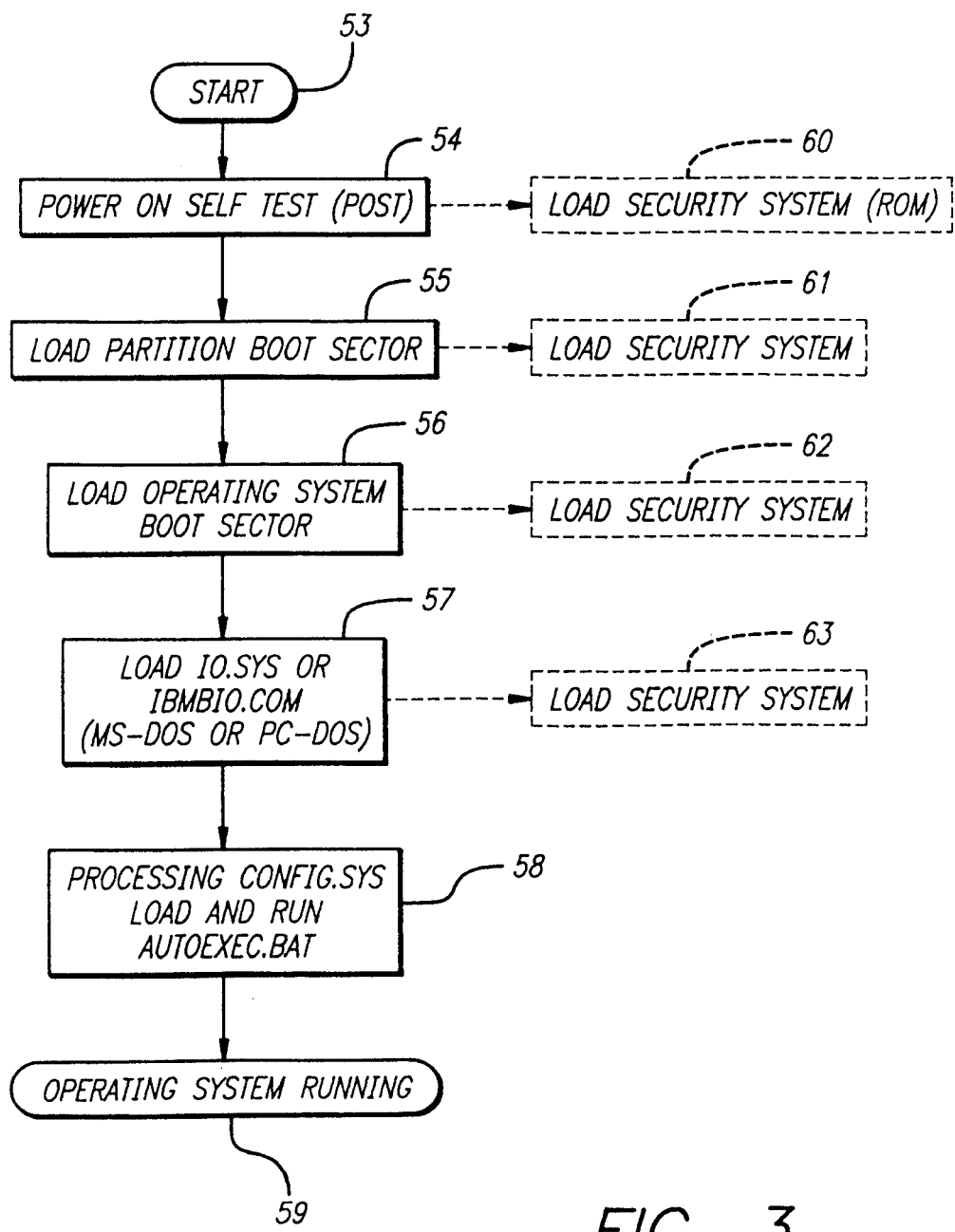
FIG. 3 is a flowchart showing the conventional method of booting up a personal computer with alternative loading points for the Agent security system shown in broken lines.

The Agent is installed during a typical boot up sequence to the operating system of a computer. FIG. 3 shows a boot-up process for a typical personal computer. The details of the boot up process are discussed in Appendix I. It should be understood that this invention is applicable to other types of computers and electronic devices presently available or as marketed in the future with suitable modifications. The aspect of the invention described below is the process of installing the security software onto a portable computer such as client computer 10. The method of installation is crucial because the software must remain undetectable once installed. Furthermore, the software should be as difficult as possible to erase. In summary, the invention achieves these objects by installing the software in such a manner that it remains hidden to the operating system, such as MS-DOS.

Figure 3B:
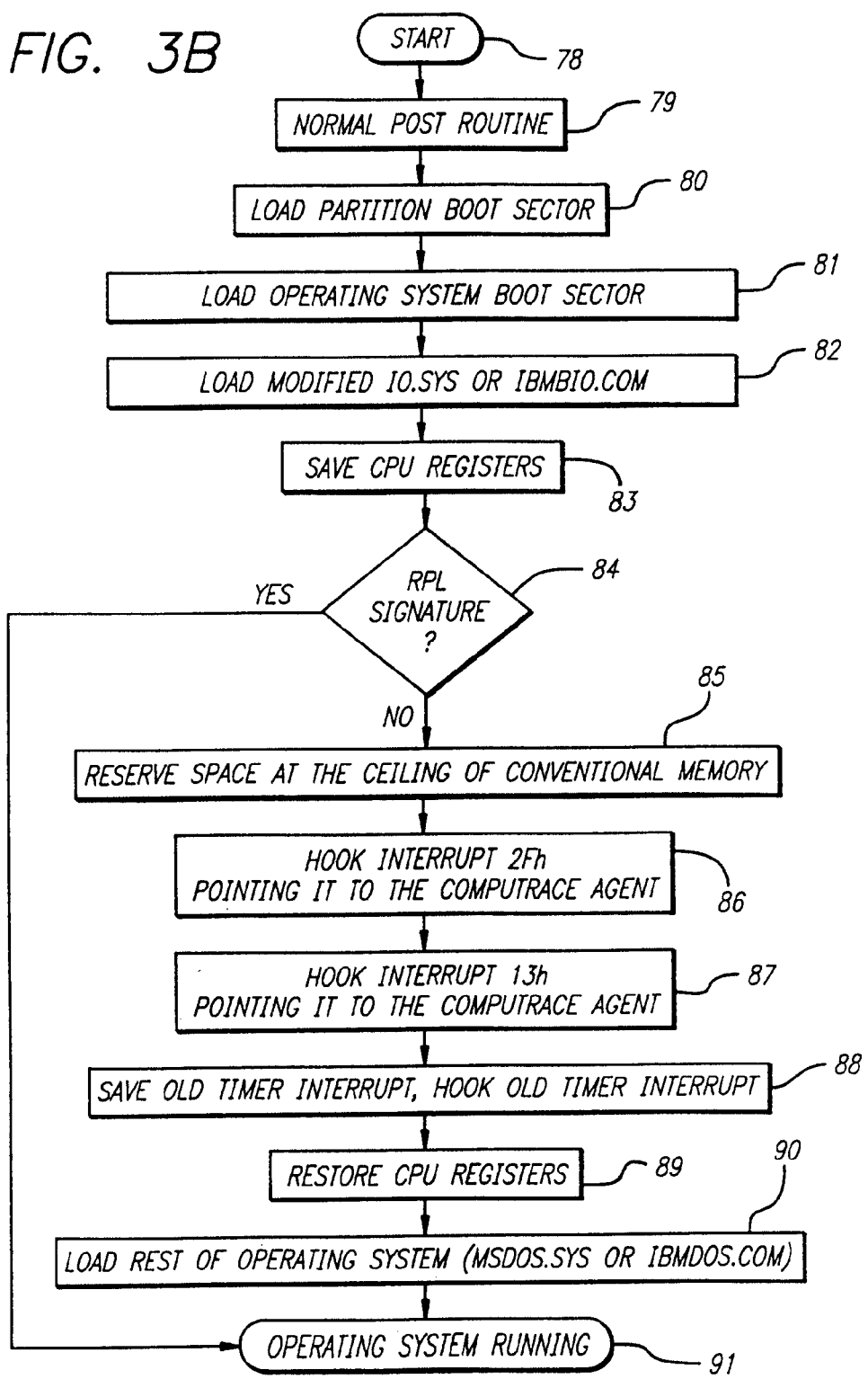
FIG. 3B is a flowchart similar to FIG. 3A wherein the hidden system file IO.SYS or IBMBIO.COM is modified to be loaded with the Agent.
Figure 3D:
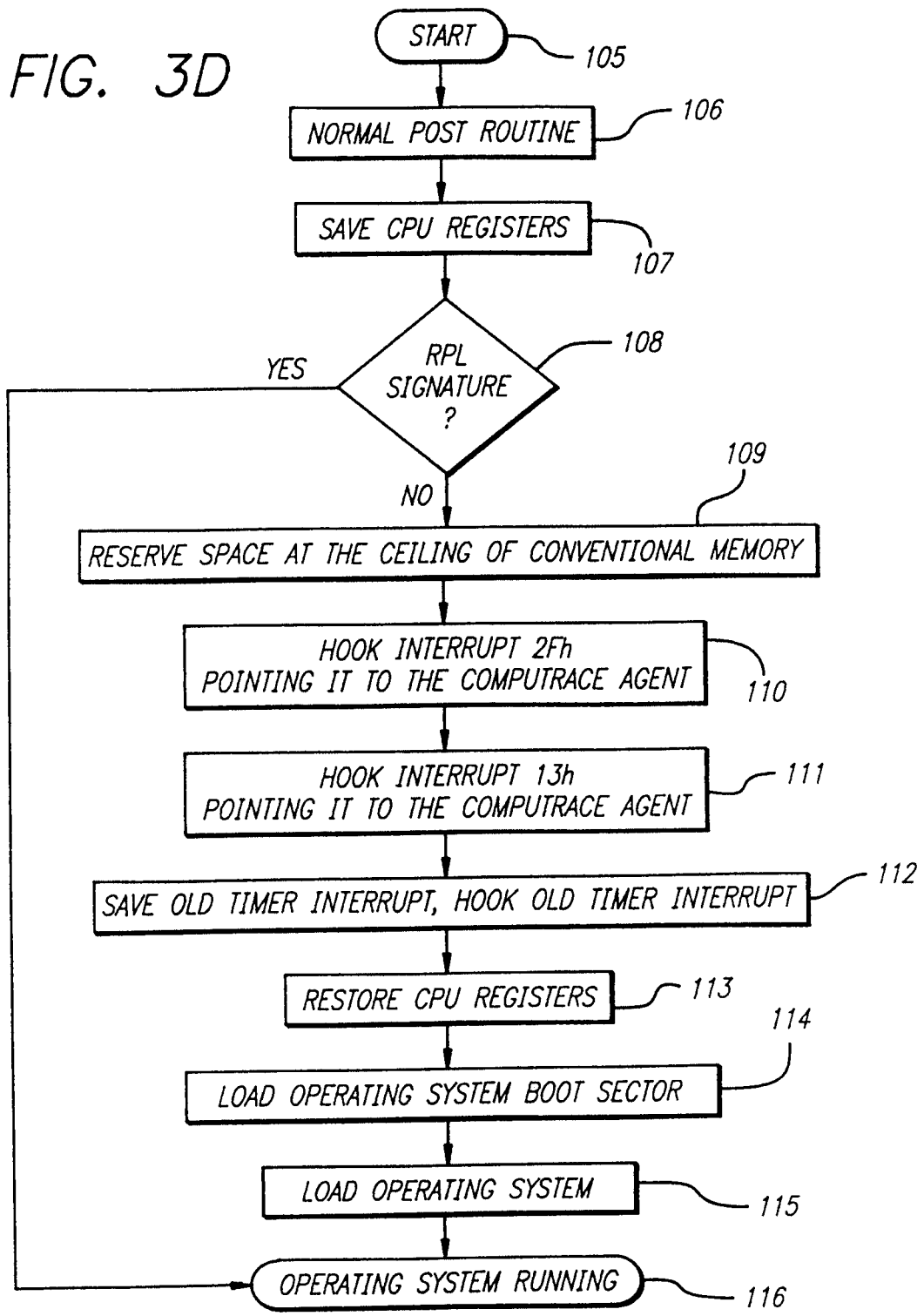
FIG. 3D is a flowchart similar to FIGS. 3B and 3C wherein the Agent security system is ROM BIOS based.

Three alternative ways of installing the Agent security system during the disk boot are illustrated in FIGS. 3A-3C respectively. A conventional boot up method is described in detail in Appendix I. A fourth alternative, installing via ROM, is shown in FIG. 3D. The system can also be installed with MS.SYS or IBMDOS.COM, but these are more difficult and less preferred than the three alternatives set out below. The loading program TENDER (further described in the Appendix) can be used to install the Agent by one or more of these alternative installation methods. Thus, the Agent may be installed in a variety of locations whereby second and third Agents can provide back up support for the primary Agent. The three locations where the Agent can be installed on the client device are as follows:

1. The operating system boot sector—See FIG. 3A.
2. A hidden system file such as IO.SYS for MS-DOS or IBMBIO.COM for PC-DOS—See FIG. 3B.
3. The partition boot sector—See FIG. 3C.

Referring to FIG. 3A, the Agent loading sequence is described for loading the Agent on the operating system boot sector. The computer 10 is powered on and the loading sequence begins 64. As is well known in the art, the computer 10 performs an initial testing routine to assure that all components are working properly 65. Illustratively, the program incorporated is the IBM-PC compatible Power-On Self Test (POST) routine. The partition boot sector is loaded 66. Next the operating system boot sector with the installed Agent is loaded 67. In an effort to maintain the transparency of the Agent, the CPU registers (corresponding to the current state of the computer) are saved 68. Before the Agent is installed there is a check for a Remote Procedure Load (RPL) signature 69. If the signature is present this indicates that the Agent is already in memory and will not be loaded again. However, if there is no RPL signature then preparation is made to load the Agent. First, space is reserved for the Agent at the ceiling of conventional memory 70. Next, Interprocess Communication Interrupt (2Fh) is hooked 71 which enables communication with other programs. Interrupt 13h, which is the disc input/output handler, is hooked 72. The old timer interrupt is saved, is and new hook timer interrupt is put into place 73. Now the CPU registers are restored 74 in order to maintain the transparency of the system. The original operating system boot sector is loaded 75. The original operating system had been moved to accommodate the Agent installation. Finally, the operating system is loaded 76 and running 77 again.

Referring to FIG. 3B, the Agent loading sequence is described 78-91 for loading the Agent on a hidden system file such as IO.SYS for MS-DOS or IBMBIO.COM for PC-DOS. The sequence is analogous to that disclosed above for the operating system boot sector. However, instead of loading the Agent with the operating system boot sector, the Agent is loaded with the operating system file 82 (load modified IO.SYS or IBMBIO.COM).

Referring to FIG. 3C, the Agent loading sequence is described 92-104 for loading the Agent on the partition boot sector. The sequence is analogous to that disclosed above for the operating system boot sector. However, instead of loading the Agent with the operating system boot sector, the Agent is loaded with the operating system partition boot sector 94.

Referring to FIG. 3D, the Agent loading sequence is described 105-116 for loading the Agent via ROM BIOS. This schematic illustrates an embodiment of this invention on firmware. The sequence is analogous to that disclosed above for the operating boot sector. However, the Agent is loaded from the ROM after the CPU registers are saved 107. At that time the ROM can take control of the system and load the Agent. Once the CPU registers are restored 113, the ROM can no longer load the Agent.

Figure 2A:
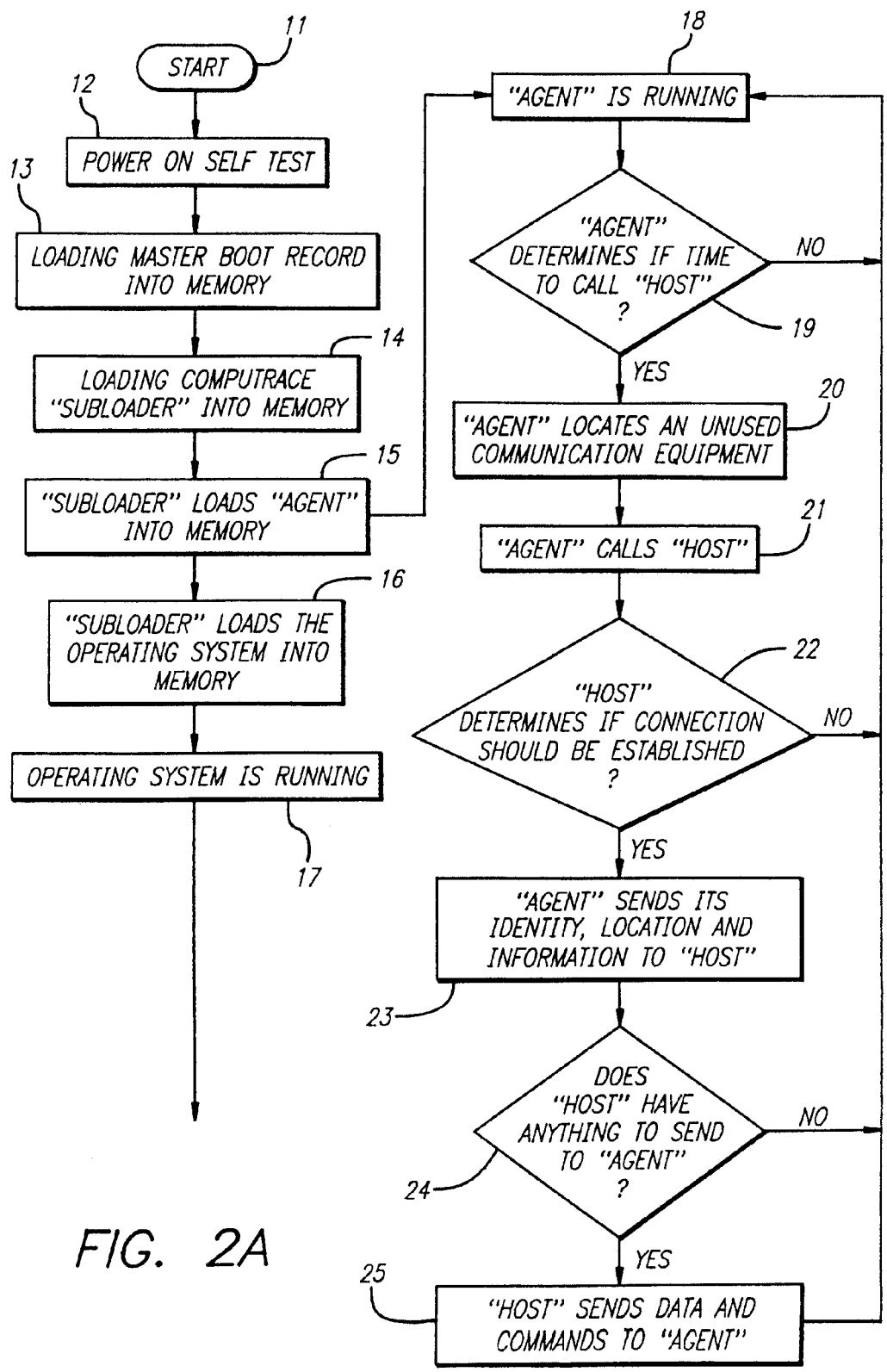
FIG. 2A is a flowchart of the process by which the operating system and Agent are able to start up and run simultaneously.

FIG. 2A is a flow chart of the Agent Work Cycle. This Work Cycle describes the method by which the Agent is loaded when the computer 10 is initially turned on, and the manner in which the operating system and the Agent run simultaneously. Once the client computer 10 is powered on 11, it performs a power on self-test (POST) 12. The POST tests the system hardware, initializes some of the devices for operation, and loads the master boot record (MBR) 13. Since the MBR was installed with an Agent Subloader, the Subloader is loaded into memory 14 and executed. The Subloader's first task is to load the Agent 15 into memory. Then the Subloader loads the operating system (OS) into memory 16 and returns control to the operating system. Now both the operating system 17 and the Agent 18 are running simultaneously.

Functions of the Agent

Referring to FIG. 2A, the Agent's primary job is to determine the appropriate time for it to call the Host Monitoring System (Host) 19 to report its status (such as identity, location and other information). Secondarily, like any terminated and stay resident program, the Agent will not interfere with any running applications unless designed to interfere. Thus, the Agent can avoid being detected. The Agent will determine if it should call the Host 18 times per second. The Agent will only call the host when a pre-defined time period has elapsed, or a predetermined event has occurred which triggers the client to contact the host. The Agent compares the current date and time with the date and time corresponding to the next time that the Agent is due to call the host. If the Agent determines that it is time to call the Host, it will do a thorough search within the computer 10 to find free (not currently being used by any running application) communication equipment 20. In an illustrative embodiment, the communication equipment is a modem 9. If the agent fails to find any free equipment, then it will abort its attempt to call the Host and repeat the cycle 18. However if the Agent locates free communication equipment, it will call the Host 21. Upon receiving a call from the client 10, the Host examines the Agent identity and determines if a connection should be established 22. If the Host does not accept the call then the Agent will not call back until the next appropriate time (after predetermined time period has elapsed) 18. If the Host accepts the call, then the Agent will send the Host its encoded identity (serial number), location (caller ID) and any other pertinent information such as local date and time 23. The Agent then checks if the Host has any data or commands for the client 24. If the Host has no data or commands to be sent, then the Agent will terminate the call and repeat the cycle 18. Otherwise, the client will receive the data or commands from the Host before it terminates the call and repeats the cycle 18. This Work Cycle is described in much greater detail in FIGS. 3F and 3G and is described in the Detailed Operation section.

The system remains transparent to an unauthorized user via implementation of well known deflection methods. Attempts to read or write to the location where the Agent has been installed are deflected in order to prevent discovery of the Agent. When read attempts are made to the Agent location the system generates meaningless bytes of data to be returned to the user. When write attempts are made to the location where the Agent is installed, the client computer 10 accepts the input data and informs the user that the write has been successful. However, the data is not really stored, and thus the Agent is preserved. In the Appendix, the source code for the disk deflection routines are disclosed within file SNTLI13V.ASM.

Detailed Operation of Agent Work Cycle

Referring to FIG. 3F, the following is a description of what happens during the period of time when the Agent security system is in "active" mode 117, 118.

Once the system is powered on, the timer interrupt will occur 18.2 times per second 117. Every 18 timer interrupts, the complementary metal-oxide semiconductor (CMOS) real-time clock will be accessed, and the time and date will be stored for comparison with the previous real-time clock access. If the date and/or time changes towards the future, no action will be taken to track the time displacement. In this way the Agent determines whether it is time to call the host 118. Thus if the current date has advanced far enough into the future (past the date and time to call the host), the Agent security system will change its mode of operation from active to alert 119 whereby calls will be regularly attempted until a call is made and a transaction with the host server has been completed. If the system time has been backdated, this will also cause a modal change from active to alert.

Figure 3G:
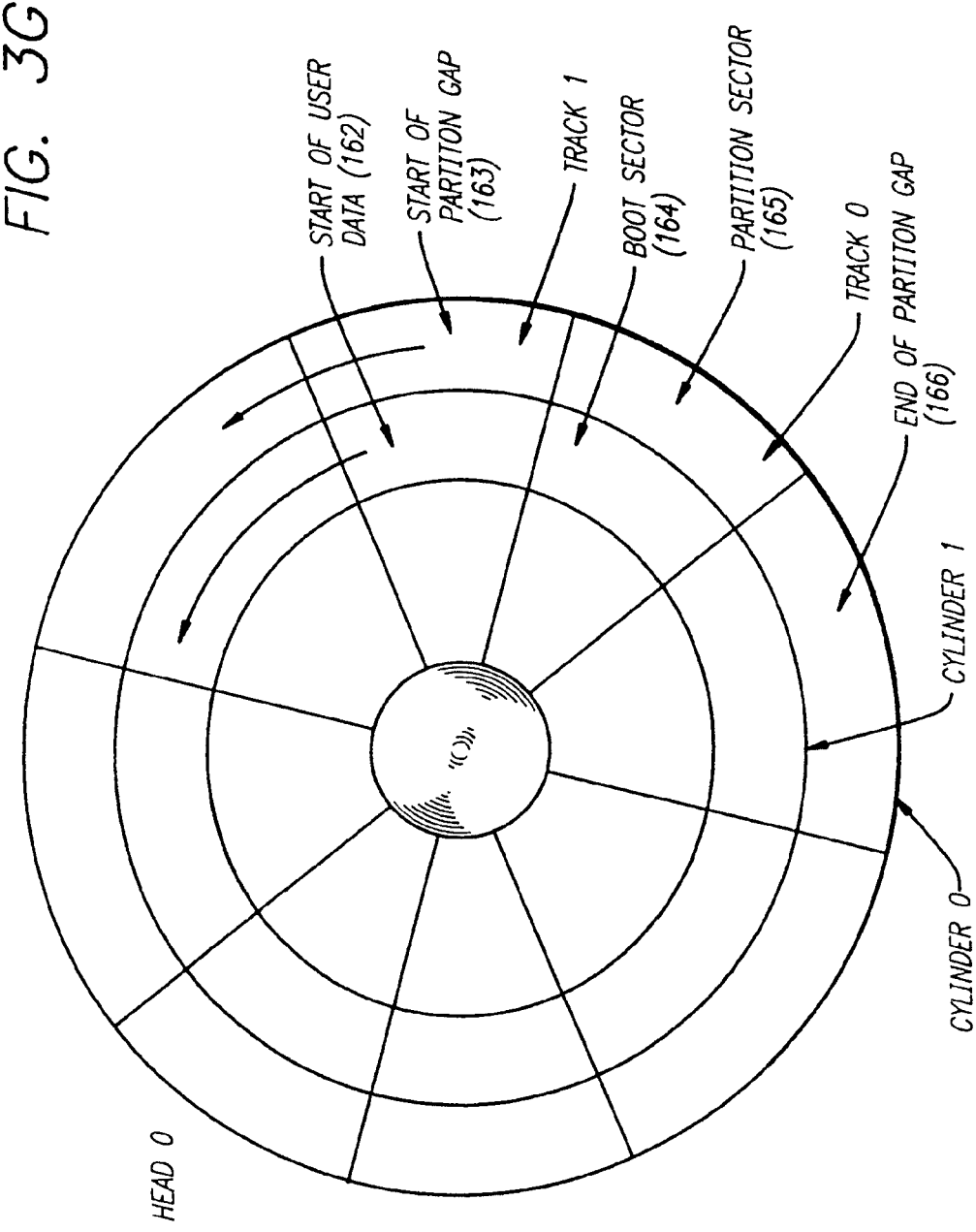
FIG. 3G is an isometric view, partly diagrammatic, of the physical structure of a computer disc.

Referring to FIGS. 3F and 3G, the following is a description of what happens when the Agent security system is in "alert" mode 119-161.

The communications ports are checked 119-125 (via a port address table 120) to see if they exist. If the first one encountered is not in use 123, it will be dynamically hooked 126 into by swapping the appropriate interrupt handler and unmasking the appropriate interrupt request line. If an error occurs, the next port will be checked 124 until either a valid port is found or the port address table has been exhausted 125. Appropriate cleanup routines restore "swapped" ports to their initial settings.

If the communications port responds properly, the system will then attempt to connect to a modem via issue of the Hayes compatible AT command 128. If the modem does not exist, then the next port will be checked 124. If the modem responds with an 'OK' to the AT command 129, the system will attempt to initialize the modem by sending it a modem initialization string 130, 132 (from a table of initialization strings 131). If the modem does not respond with an "OK" 134, this indicates that the initialization attempt failed 135. If the initialization attempt failed, then the next string in the table will be tried 136, and so on until a valid initialization string is found 134, or the modem initialization string table is exhausted 136 (at which point, the routine will delay for some seconds then try again from the start, using the first initialization string 130).

Once a valid and available communications port has been found, and it has been verified that a functional modem is associated with that port, the system will attempt to dial out to the remote host server 137, 138.

A dial string table 140 is used 139 to attempt the call since a PBX or switchboard etc. may need to be exited via a dialing prefix. If successful 141-143, the CONNECT result code (numeric or letters) from the remote host server will be received by the client 143. The host will send a signal ("Query") to the client requesting its serial number. If the client does not receive the query signal 148 it will abort 149 and repeat the cycle 119. If the client receives the "Query" signal, then the serial number is sent 151. At this point, telecommunications have been established and the client-server transaction begins. If the transaction succeeds, the resultant state will be "active", otherwise "alert". If, for some reason, a "NO DIALTONE" event happens 144, a delay will occur 147 and the next dial string 141 will be attempted. If the line is "BUSY" 145, then a redial attempt 146 will occur using the same dial string for a predefined number of attempts or a telecommunications connection is made, whichever comes first.

The client to remote host server transaction involves the sending of the computer serial number 151 via the telephone company or carrier service. The "Caller ID" is implicitly received by the remote server (typically during the initial telecommunications event known as "RING"). Upon the telecommunications event called "CONNECT", the remote host server sends the Agent security system client a vendor specific message called "QUERY" 148 which in effect tells the client to send the serial number. The sending of this serial number 151 involves the server acknowledging that it has indeed received 152 and processed 154 the serial number (validating it). The client computer will attempt to send this serial number a predefined number of times 153 before it gives up (disconnect, cleanup, unhooks port 127, 155 and returns to "alert" mode 156). At this point, the modem disconnects 160. Any other cleanup necessary (such as changing the date of the last call to the present) will also be done here 160. Finally, the resultant state will be reset to active 161.

If the computer that called in was not reported stolen, no further action with regard to the computer system that, called in will be taken. If, however, the serial number transmitted to the remote host server matches one of the serial numbers on a currently valid list of stolen computers, further processing will occur to facilitate the recovery of the missing equipment.

Such processing includes, but is not limited to, placing either an automatic or manual call to the local authorities in the vicinity of the missing equipment or the owner of such equipment.

Host Identification and Filtering System

Figure 2B:
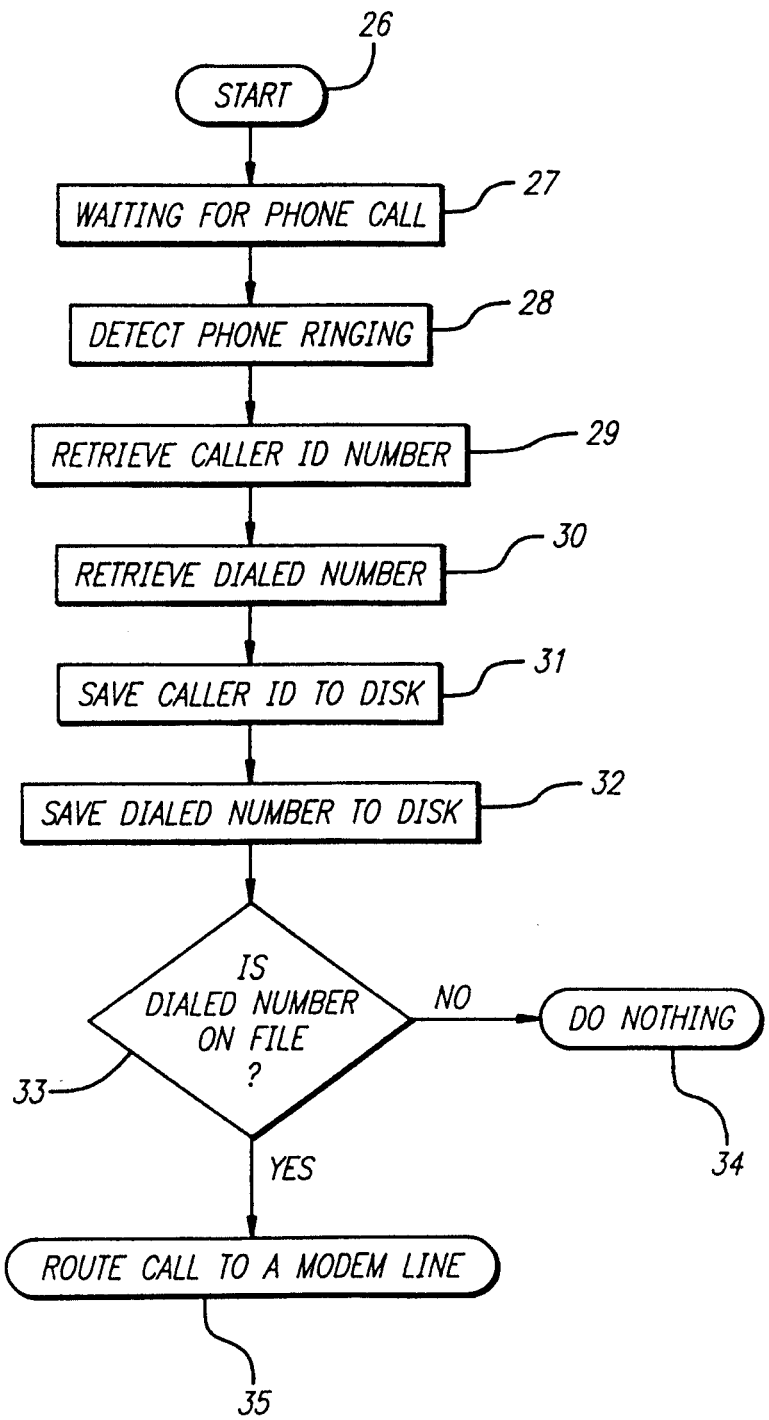
FIG. 2B is a flowchart of the process by which the Host Identification and Filtering Subsystem identifies and filters out unwanted calls from Agents.

The Host Identification and Filtering System identifies and filters out unwanted calls from Agents. FIG. 2B is a flow diagram of the Host Identification and Filtering program executed by host computer 3. Once the security program is executed 26, the voice board waits 27 for the ring signal on the telephone line 1. When a ring signal is detected 28, the voice board 2 acknowledges the incoming call by sending a signal to the telephone company 9B via telephone line 1 requesting that the caller ID and the dialed numbers be sent to it. The voice board then waits until these numbers are received 29, 30.

Once the caller ID and the dialed numbers have been received, they are saved to the hard disk 31, 32. The security program then compares the dialed numbers 33, which provide a coded version of the serial number of the client computer 10 (coding scheme explained in detail below), against a list of serial numbers stored on the hard disk 4. If no match is found, the program lets the phone ring until the client computer 10 hangs up the telephone line 1. In the preferred embodiment, the client computer is programmed to hang up after 30 seconds of unanswered ringing. However, if a match is found, the security program routes the call to an appropriate receiving line connected to a modem 35, which answers the call.

Encoding of the Client Computer Serial Number

Figure 4:
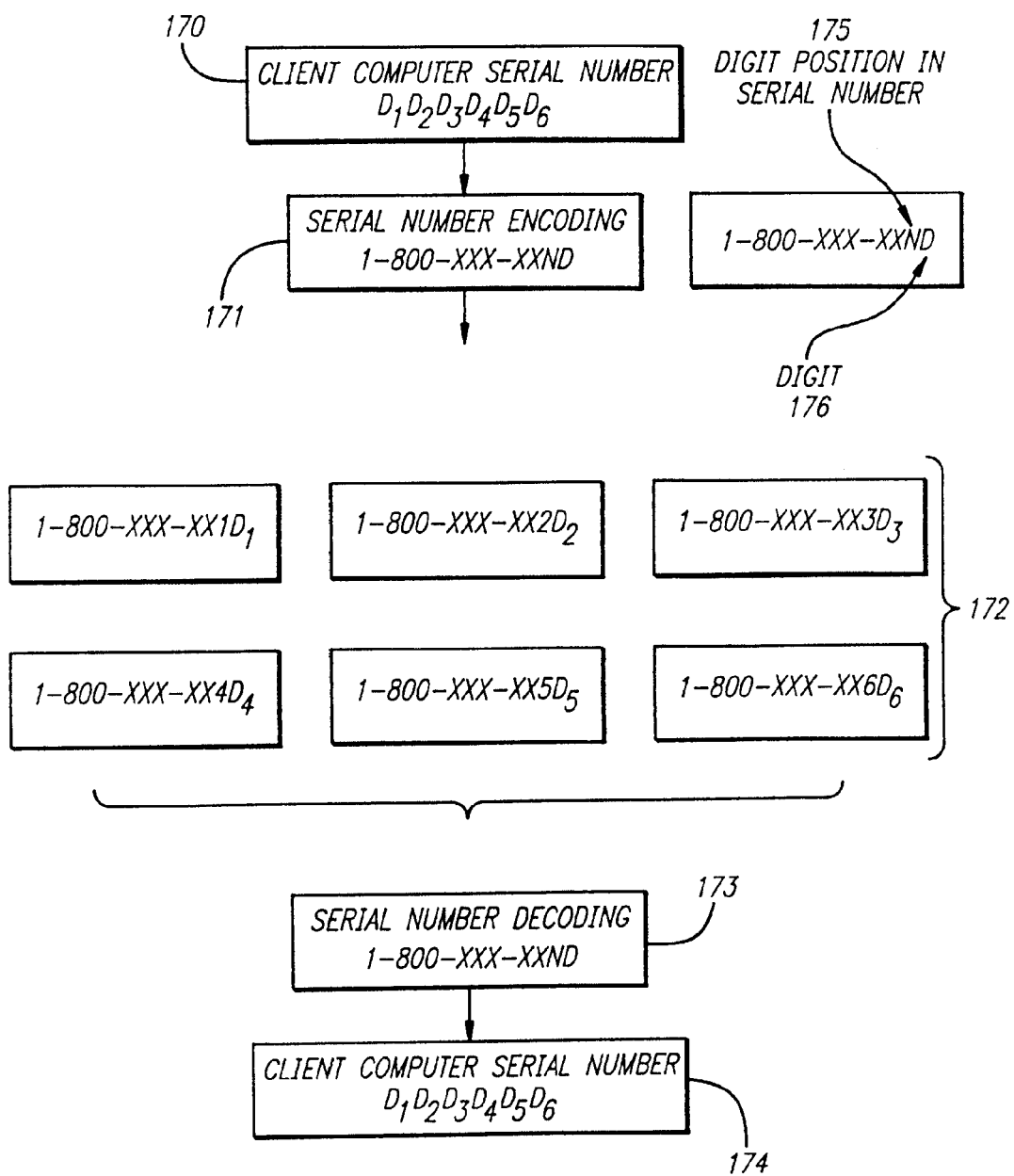
FIG. 4 is a schematic showing the encoding/decoding method whereby the monitoring service would have to subscribe to 60 telephone numbers.

Referring to FIG. 4, the serial number of client computer 10 is encoded within the dialed numbers it sends to the host 3. In the preferred embodiment of the invention, the client computer transmits its six digit serial number 170 to the host via a series of six complete dialed phone numbers 172. The first eight dialed digits after the first "1" are meaningless. The ninth dialed digit "N" 175, indicates which digit position within the serial number that the tenth dialed number corresponds to. The tenth dialed digit "D" provides the Nth digit of the serial number. The host computer 3 receives the six complete dialed phone numbers 172 and decodes them 173 by looking at only the ninth and tenth dialed digits. The client computer serial number 174 is thus reproduced.

For example, in the sequence "800-996-5511", the only relevant digits are the "11" portion. The first "1" indicates that the digit immediate to its right (1) is the first digit in the serial number. Similarly, in the sequence "800-996-5526", the "2" indicates that the number immediate to its right (6) is the second number in the serial number. The client 10, in total, dials six numbers 172 in order to convey its six-digit serial number to the host.

In order to accommodate this method of serial number coding, the host monitoring system needs to subscribe to sixty different phone numbers. All sixty numbers should have the same first eight digits, and only vary from one another with respect to the last two digits. The ninth digit need only vary from "1" through "6" corresponding to the six digits within a serial code. However, the last digit must vary from "0" to "9".

Figure 4A:
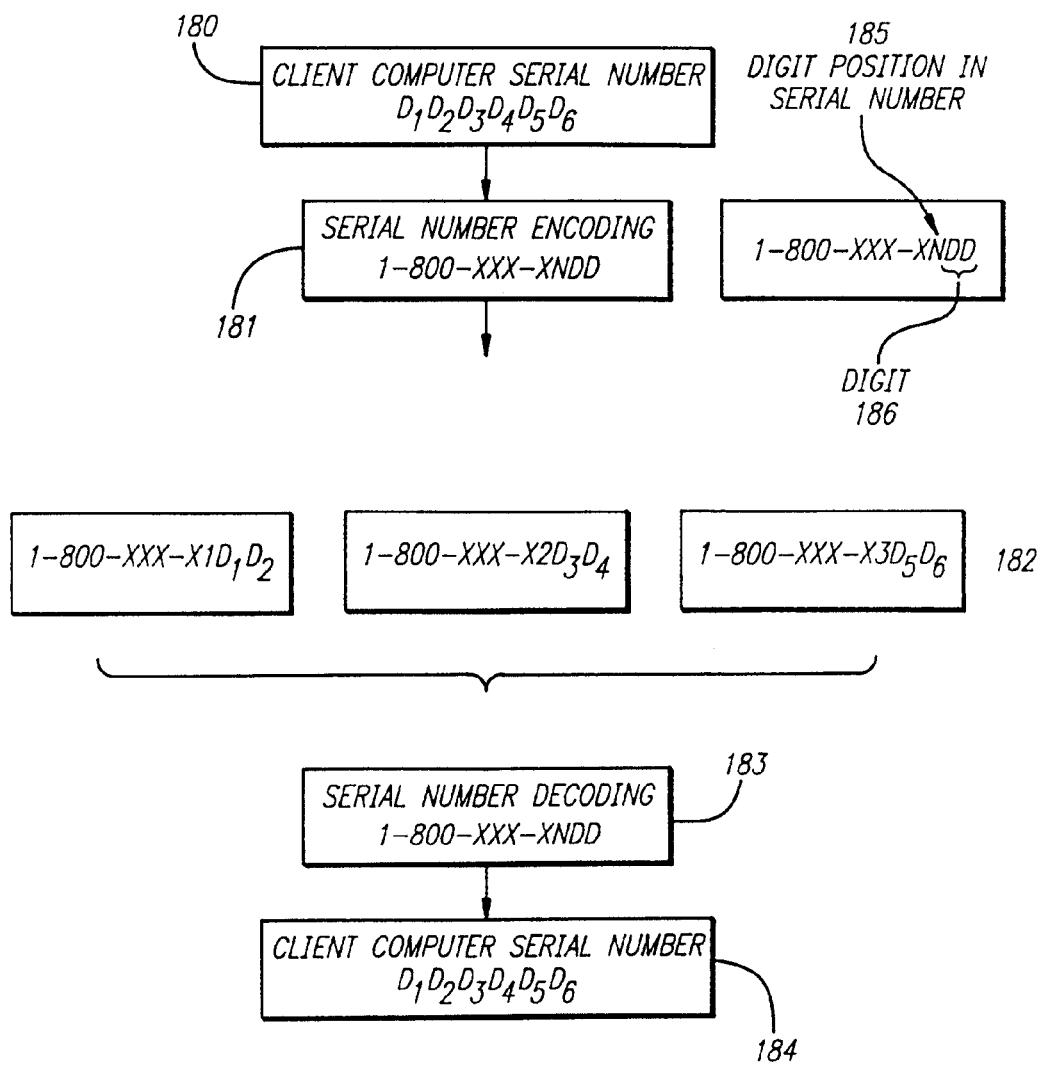
FIG. 4A is a schematic showing the encoding/decoding method whereby the monitoring service would have to subscribe to 300 telephone numbers.

Referring to FIG. 4A, the coding system can alternatively be modified such that the client computer 10 need only call the host three times to convey its serial number 180.

According to this coding method, two digits of the serial number 186 would be transmitted in each call. Thus, the eighth dialed digit 185 would vary from "1" to "3", corresponding to the three packets of two digits 186 that make up the serial number 180. The ninth and tenth dialed digits 186 would vary from "0" through "9". However, this would require the operator of the monitoring system to subscribe to three hundred different phone numbers.

Host Processing, Auditing and Communication Subsystem

Figure 2C:
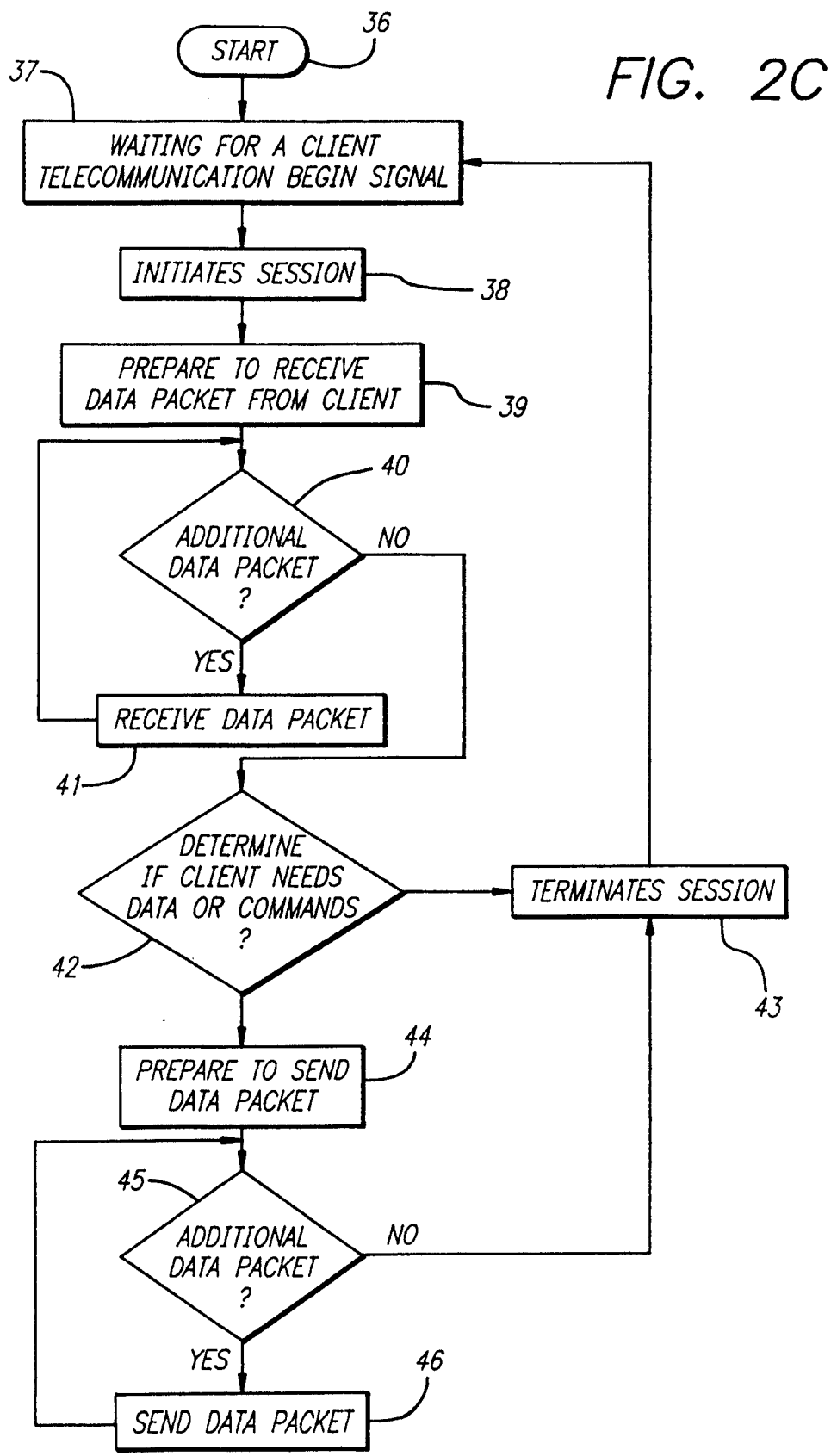
FIG. 2C is a flowchart of the process by which the Host Processing, Auditing and Communication Subsystem, contained within the host computer, exchanges data with an Agent.

Referring to FIG. 2C, the Host Processing, Auditing and Communication Subsystem receives and transmits information to and from clients. FIG. 2C is a flow diagram of the Host Communication program executed by host computer 3. After the host computer 3 is powered on 36, communication equipment is instructed to wait 37 for the telecommunication begin signal from the client computer 10. The telecommunication equipment acknowledges the begin signal by initiating a session to communicate with the client computer 38. The program first checks the client computer 39 to establish that it is sending data packets 40, and then receives the packets 41. Next, the program determines if the client has any data or commands to be sent to the host 42. If not, the session is terminated 43, and the cycle is repeated 37. When all data packets have been received, the program permits the host to send data packets to the client computer. The program prepares to send data packets 44, and then establishes that there are more data packets to be sent 45 before sending each packet 46. Once all data packets have been sent, the program terminates the session 43, hangs up the phone, and prepares to repeat the entire cycle 37. Host-side source codes are disclosed in the Appendix in Visual C++ (Microsoft) Code.

Host Notification Subsystem

Figure 2D:
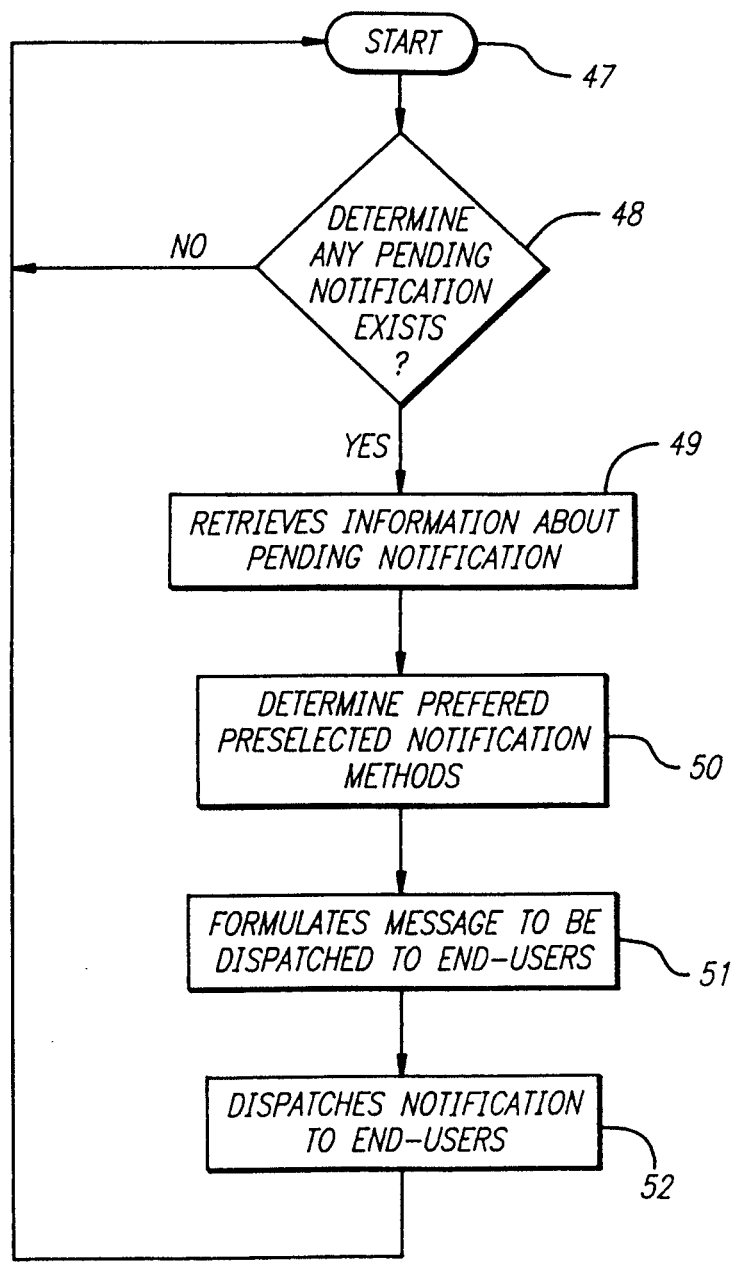
FIG. 2D is a flowchart of the process by which the Host Notification Subsystem, contained within the host computer, notifies end-users of the status of monitored devices.

The Host Notification Subsystem notifies the end-users regarding the status of their electronic devices. In FIG. 1, various methods of notification such as; electronic mail N1, fax N2, paging N4, and telephone call N3, are depicted. FIG. 2D is a flow diagram of the Host Notification program executed by host computer 3. The Host Notification program determines whether there are any pending notification instructions or commands 48. If there are pending notifications, the information is retrieved 49. The program then determines the preferred preselected notification method 50, and formulates the message to be dispatched 51 according to the preselected notification method. This message is dispatched to the end-user 52. After dispatching the message, the program repeats the entire cycle 47. Host-side source codes are disclosed in the Appendix in Visual C++(Microsoft) Code.

Variations and Alternatives

The above description relates to the Agent security system installed and operating in a conventional PC with an Intel 80.times.86 microprocessor or equivalent and with a conventional MS-DOS or PC-DOS operating system. It will be recognized that the system can be modified to fit other types of computers including, for example, those sold under the trademark Macintosh. The system can easily be modified to suit other types of operating systems or computers as they develop in this rapidly advancing art.

The above system is also intended to be added to existing computers without physical alteration. Another approach is to modify the ROM of such computers to contain the Agent security system as shown in FIG. 3D. This is generally not considered to be feasible for computers sold without the security feature, but is a theoretical possibility. More likely is the possibility of incorporating the Agent security system into the, ROM of portable computers, cellular telephones or other such items when they are manufactured. FIG. 3D above describes the loading of the system from such a modified ROM.

The description above also assumes that the computer device has a modem connected thereto or includes an internal modem. In the future it is likely that telephone systems will be digitized, thus obviating the need for a modem.

The system could also be included in the ROM of a cellular telephone. In this case, the program should be designed to hide the outgoing calls from the user by silencing audio signals and maintaining a normal screen display. It is also conceivable that portable computers can be supplied with integral cellular telephones modified in this manner or with some other telecommunication device. It is not clear at the time of this invention exactly which direction the field of telecommunications will likely go in the immediate future. The main telecommunication criteria for this Agent security system is that the outgoing transmission (wire, radio signal or otherwise), be received by a switching mechanism, and contain information that causes the switching mechanism to forward the information received to a remote station. Presently, this information is a telephone number. But other indicia of the remote station may be substituted in alternative switchable communications systems.

Attached hereto are appendices relating to the following: (1) Description of the conventional boot up method; (2) Details of Agent installation; (3) Brief description of the routines; and (4) Copy of the source code of both the client-side and host-side. The host-side source code is in Visual C++ (MicroSoft). The client-side source code is in Tazam Assembler Code by Borland.

It will be understood by someone skilled in the art that many of the details described above are by way of example only and are not intended to limit the scope of the invention which is to be interpreted with reference to the following claims.

APPENDIX I

Conventional Boot Up Method

Referring to FIG. 3H, an isometric view of a computer disc is shown. This figure illustrates the location of the start of user data 162, partition gap 163, boot sector 164, partition sector 165, and partition gap 166.

Referring to FIG. 3, upon hitting the on switch of a personal computer (PC) 53, the computer first goes through a conventional power-on self-test (POST) 54. At this point the Agent could be loaded if ROM-BIOS loading is used 60. POST ensures that all hardware components are running and that the central processing unit (CPU) and memory are functioning properly. Upon completion of the POST, the next task is to load software onto the random access memory (RAM) of the computer. Conventionally, there is a read-only memory (ROM) device which contains a boot program. The boot program searches specific locations on the hard disk, diskette or floppy disk for files which make up the operating system. A typical disk is shown in FIG. 3H. Once these files are found, the boot program on the ROM reads the data stored on the applicable portions of the disk and copies that data to specific locations in RAM. The first portion of the disk boot sector to be loaded is the partition boot sector 55 shown in FIG. 3H as 165. At this point the load partition boot sector method could be used 61. The partition boot sector 165 then loads the remaining boot sector 164 from the disk, namely the operating system boot sector 56. Now the Agent could be loaded according to the load operating system boot sector method 62. The operating system boot sector 164 loads into memory a system file, normally named IO.SYS on personal computers or IBMBIO.COM on IBM computers 57. Now the Agent could be loaded according to the IO.SYS or IBMMIO.COM methods. Each of these files is marked with a special file attribute that hides it from the DOS Dir. The IO.SYS or equivalent then loads the rest of the operating system, conventionally call MSDOS.SYS on MS-DOS systems, and IBMDOS.COM for PC-DOS systems. Next the AUTOEXEC.BAT is processed and run 58. Now the operating system is running 59. The Agent security system according to the invention is loaded during the boot up process and accordingly is transparent to the operating system.

APPENDIX II

Details of Agent Installation

Once the TENDER program, which enables the Agent to be installed, has been run and the Agent has been determined to be loaded via one, two or three of these alternatives, the system is primed and proceeds to attempt to install the Agent security system according to the present state of the computer memory and the instructions given by the programmer. The SNTLINIT routine initializes the Agent security system and is passed one of three possible loading options via the AX microprocessor register by the calling program (SUBLOADR), which itself was loaded on any one of the three enumerated locations described above. The SUBLOADR program reads the configuration file (which may be encrypted) that was generated for user input. The validity of the configuration file is checked at this point to see if it is corrupted or not. If for some reason it cannot read the configuration file, it initializes the Agent security system from a table of default settings.

The SUBLOADR program then checks to see if the Agent security system is in memory by looking for the "RPL" signature. SUBLOADR saves the application programmer interface (API) entry point and then determines which version of the security program, if any, is in memory. If not in memory, the SUBLOADR program searches the disk for the SNTLINIT routine. Depending upon the version of the SUBLOADR program, it may perform a validity check on the SNTLINIT routine. This routine may be a cyclical redundancy check (CRC) of 16 or 32 bits, a checksum check or a hash count.

The TENDER program checks the partition boot sector, the operating system boot sector, and the IO.SYS (or IBMBIO.COM on PC-DOS systems) to see if any of them have been modified to contain the SNTLINIT code. A comparison to the configuration file is made to determine if the Agent has already been installed in any of the alternative locations. If the Agent has already been installed, the TENDER program takes no action. It then tracks the level of modification that was requested by the user (i.e. whether one, two or three areas were to be modified). Each of these areas has all the modem related information written to it amongst other user selected settings. At this point it writes the current configuration file to disk.

The TENDER program then takes a system snapshot of the partition boot sector, the operating system boot sector and the IO.SYS or IBMBIO.COM file, validating them, determines and then writes this file to disk. It then checks the partition gap between the partitions, calculating the number of unused sectors between the valid boot sectors (be they partition or operating system boot sectors).

There is almost certainly at least 8K of space in the partition gap 163. The Agent security system requires only 4K. The SNTLINIT module is usually stored here. If for some reason there is not enough space in the partition gap, or if the data area is physically unusable, the TENDER program will pick a suitable cluster of sectors, mark the data area logically as being unusable, then store SNTLINIT in the cluster of sectors. The TENDER program sets out the attributes to system, hidden etc in order to hide the program image. It then calculates the physical coordinates of the cluster that was used and writes this information to the configuration file. At this point the system is ready to proceed and will be loaded prior to the completion of the loading of the operating system regardless of what strategy the programmer has chosen.

In a manner similar to how viruses reinfect the boot sector 164 of the hard disk drive, the Agent security system according to the invention uses such technology to help protect against theft of the computer. Other technologies such as system timer programming and communications programming are bound to this virus like technology to create a new technology. It should also be understood that a security company which handles incoming calls from clients may readily redefine the time period between successive calls from a client to its host.

The system is typically in one of two modes of operation: (1) Waiting until it is time to call/report into the server—"active mode"; (2) Calling or attempting to call the server—"alert mode". When the Agent security system changes it mode of operation from active to alert mode, the activation period is reduced to a minimal period such that the Agent calls the host eighteen times per second until a successful connection is made. The activation period in active mode is predetermined, and likely to be days if not weeks. This shortened activation period (time between successive calls) is necessary to prevent busy signals and other temporal error conditions from precluding transaction attempts. The system will stay in this alert mode until a valid transaction has been completed.

Since MS-DOS and PC-DOS were designed to be single-user, single-tasking operating systems, the timer interrupt is used to run the system unattended and automatically in the background to provide multi-tasking. Neither the user nor a potential thief would notice this background process although registered owners will be aware of its existence.

In a standard personal computer, routine housekeeping tasks are performed periodically and automatically by the CPU without instructions from the user. There is a timer routine which is called 18.2 times per second to perform such tasks as turning off the floppy disk motor after a certain period of inactivity. The Agent security system hooks into this timer routine. The total timer routine takes about 55 milliseconds and the Agent security system utilizes a small portion of CPU time during that period; this is limited to less than 0.5% of the total timer routine. This is not sufficient time to run the entire security program. Accordingly, the security program is run in small increments with each timer routine. It is important that the security program not "steal" enough computer time to be noticed. Otherwise the computer would be noticeably slowed and the existence of the program might be suspected.

Serial port and modem setup routines must be called by the timer interrupt. Once this is done, the serial interrupt handler that is being used will handle the details of data transfer between the client and host systems. Once the system is set up, the serial port interrupt handler does most of the work with the timer interrupt acting as a monitor watching the transaction when it happens between the client and the server. It analyzes the receive buffer and takes the appropriate actions as necessary. The communication portion of the system can handle outgoing and incoming data transfers on its own since it has its own access to the CPU via its own interrupt request (IRQ) line, typically IRQ3 or IRQ4. Therefore, the system can handle the data flow between the client machine and the server unattended.

At the start of its time-slice, the timer interrupt checks the flag, which is set when a user uses the modem, in the Agent security system, the InComISR flag byte (In Communications Interrupt Service Routine). If the flag is set, the timer interrupt exits immediately so as not to interfere with the progress of any serial communications that may be occurring, therefore not disrupting any transaction in progress. If the flag is not set, the timer interrupt routine will check to see if the Agent security system is in an error state. If not in error, a flag called TimerISR count is set to indicate that a timer interrupt is in progress.

A deferred execution function pointer is used to point to the upcoming routine to be executed. Just before the timer interrupt routine finishes, it points to the next routine to be executed. When the next timer interrupt occurs the routine that was pointed to will be executed. The routine must complete in less than 55 milliseconds so that the next timer interrupt does not occur while the routine is still executing.

Attached to the PC's system bus are communions ports, all of which are optional and typically called COM1, COM2, COM3, COM4 for the first four ports. It is unusual to have more than four serial ports in a PC that is using only MS-DOS or PC-DOS as its operating system. The Agent security system also requires that a modem be connected to one of these serial ports so that calls can be made to a remote host server using normal telephone lines or dedicated telecommunications lines. When alerted 118, the Agent security system needs to be able to find an available serial port 119-122, once it does so it checks to see if a modem is attached 128-129 and tries to initialize it by sending it an initialization string 132. If successful, it checks for a dialtone, then tries to make a quiet call to a remote host server 141. Once the server has been connected, the client machine attempts to initiate a dam transaction with the server so it can send its serial number and other data defined to be part of the transaction 151. The server is configured to connect at 2400 bps with no parity, 8 data bits and 1 stop bit. Thus the client matches this configuration. This allows a high connection reliability.

APPENDIX III

Description of Routines

SNTLINIT:

After this routine has been loaded high into conventional memory 67 and execution has been passed to it, the machine state is saved 68. Conventional memory is the first 640 kilobytes (655,360 bytes) of memory on an Intel 80.times.86 compatible computer for example. Registers 15 that are affected by this routine are saved on the stack, "saving the machine state". The stack referred to is a LIFO structure, where the LIFO stands for "last in first out". It is where you can temporarily save the contents of CPU registers so that you can restore their initial values.

The microprocessor register AX is used to pass one of three values to the SNTLINIT routine. Depending upon which of the three values are passed to this routine, three different courses of action will be taken. Each course of action describes how the program will initialize itself. To summarize this routine initializes the Agent security system from either the partition boot sector 55, the operating system boot sector 56 or the input/output module of the operating system 57.

If the microprocessor register AX contains the value 0:

The partition sector 165 is loaded into memory (which has been overwritten on the disc with the boot sector version of the SUBLOADR module). On execution of this code, the SNTLINIT is called.

If the microprocessor register AX contains the value 1:

The boot sector 55 of the hard disk (which has been overwritten on the disc with the boot sector version of the SUB- LOADR module) is loaded into memory. On execution of this code, the SNTLINIT routine is called.

If the microprocessor register AX contains the value 2:

The first sector of IO.SYS/IBMBIO.COM 57 (which has been overwritten on the disk with the IO version of the SUB-LOADR module) is loaded into memory.

This routine then tests to see if it is in memory already by checking for the 'RPL' signature 69, 84, 96, 108 located at the start of the address for Interrupt 2FH. If it is in memory, this routine exits 77 (to avoid loading more than one copy of the program into memory). If it is not already in memory, then it points (hooks) Interrupt 2FH to an internal routine 71, and does the same with Interrupt EAH 72. It then hooks Interrupt 8 after saving the original Interrupt 8 vector to an internal memory location (internal to the Agent security system).

The machine state is restored 74 and the routine exits by jumping to memory location 0000:7C00H for the partition table and boot sector execution paths or 0070:0000H for the IO execution path 75, 76.

SNTLAPI:

This API is for use by an external program. It has three functions as follows:

1. Get state of Agent security system. (Checks to see if Agent is already installed.)
2. Set state of Agent security system.
3. Set serial number of system.

SWAPINT:

SwapInt stores the existing interrupt vector by replacing the vector for the interrupt number in the CPU register BX with the new vector pointed to by the CPU register pair DS:CX after it stores the current vector at a location pointed to by the register pair DS:DI. If the CPU register DI contains 0 then the vector for the interrupt number contained in the CPU register BX is not stored.

DELAYFUNC:

This is a delay function used for hardware timing purposes. This routine is used in FIG. 3F, block 125.

TIMERISR:

Interrupt 8 h/1 Ch is the System Timer Interrupt which executes 18.2 times per second 117 and is used to do the following:

1. Call the old system timer interrupt.
2. Check to see if a communications interrupt is occurring, exiting immediately if so.
3. Save affected CPU registers.
4. Check for an internal state error, exiting immediately if so.
5. Call the state routine.
6. Restore the saved CPU registers.

ACTIVEROUTINE:

The ActiveRoutine checks to see if the activation period has been exceeded 118. By activation period we mean a period of time that has elapsed since the last valid security call. This period of time is set during the transaction to the server, but is initially set to approximately 7 days.

CHECKNEXT PORT:

This is a check for valid serial ports, and involves checking a table of serial port addresses 120 and then testing them to ensure their functionality 122. If a valid serial port cannot be found, a sleep state is entered 125. Upon awakening, this routine is repeated 119.

DELAYLOOP:

This delay is used for communications delays due to busy signals or no dial-tone and other problems that can affect the communications link.

PORTFINDINIT:

This procedure calls the previously described CHECKNEXTPORT function 118, 119 in its quest for a valid serial port to initialize. On finding a valid serial port, it stores the ports address, and its corresponding interrupt vector.

PORTFIND:

This is a check to see if the serial communications port is in use 123 by dynamically testing the registers in the universal asynchronous receiver—transmitter (UART) that is associated with the current serial port address. Specifically, it tests the Interrupt Enable Register of the UART. This UART register is read into the AL register of the CPU, and if any of the bits are set (logical 1), then the port is in use, otherwise the port is idle. It also tests the interrupt enable bit of the modem control register in the UART. If the bit is not set (logical 1) then the port is idle and available for use.

Each serial port in the port table 120 is checked until either a valid one is found 123, or the routine goes to sleep 125. If a serial port is found 123, this routine will decide whether or not to initialize the UART using the system BIOS. Interrupt 14H routine, or bypass this routine, programming the UART registers directly. If an error occurs during this process, the routine is exited, and CHECKNEXT PORT is invoked.

If the serial port is successfully initialized 128, 129 to the predefined bit rate, panty, word size, number of stop bits etc., the UART is cleared of any pending errors. The serial port buffer is flushed (emptied), so there is no chance of old data being picked up a second time. The state flag that the timer interrupt checks on each clock tick is cleared, as interrupt driven communications have not yet been set up. The appropriate interrupt number is selected and the old interrupt vector is swapped with the new one by calling SWAPINT. The statuses RTS (Request to Send) and DTR (Data Terminal Ready), are enabled in the UART. The 8259 PIC is then unmasked, interrupts are enabled in the UART, then the hardware interrupts for the CPU are enabled. Then this routine exits.

MODEMFINDDELAY:

This procedure sets the [state-routine] function pointer to point to the MODEMFINDINIT routine, delaying execution until the next interrupt.

MODEMFINDINIT:

This routine points to a string to send to the modem, then calls the COMTRANSINIT routine.

MODEMINITINIT:

This procedure tries to initialize the modem 130 with an appropriate initialization string from a table of initialization strings 131, and will try until either the modem is initialized or there are no more initialization strings in the table to try. The COMTRANSINIT routine is called from within this procedure 132-136.

MODEMINIT:

This procedure checks the state of the transmission, and checks for incoming data by calling the COMTRANS and COMTRANSCHECK routines 132. This procedure ends by jumping to a jump table which points to the next appropriate routine.

MODEMCALLINIT:

This routine attempts to place a call 137, 138 by selecting a telephone number 139 (and its appropriate prefix if necessary) from a table of dial strings 140. It will continue to do so until either a call is completed 148 or there are no more initialization strings in the table to try. If a call could not be made 144 then the CLEANUPROUTINE and ERRORROUTINE procedures are to be run during the next state(s) (Interrupt 8 system timer ticks) 15S.

MODEMCALLINIT2:

This routine checks the state of the transmission, ending if it is complete. This procedure is called from within the MODEMCALLINIT routine. It in turn calls the MODEMCALL procedure.

MODEMCALL:

This routine checks the state of the transmission, ending if it is incomplete. It also checks to see if data has been received yet or not.

MODEMCONNECTINIT:

This procedure waits for a query from the host server 148 (at the other end of the communications link), and sends the serial number 151 of the computer. If a call could not be made then the CLEANUPROUTINE and ERRORROUTINE procedures 155 are to be run during the next state(s) (Interrupt 8 system timer ticks).

MODEMCONNECT:

This routine checks the state of the transmission, ending if the transmission is incomplete.

CLEANUPROUTINE:

This routine resets the Agent security system 155, 156 (sometimes referred to as Sentinel in the source code) back to a known state (ACTIVE), zeroes the transmissionstate flags, flushes the UART buffer. Then it disables all interrupts, restores the old communications interrupt service routine via the SWAPINT procedure. It then sets the state routine function pointer to the CLEANUPROUTINE (to be rim during the next Interrupt 8).

ERRORROUTINE:

The Agent security system state is set to SNTL STATEERROR (the Agent security system is put in an error state).

COMISR:

The interrupt service routine used to control one of the systems serial communications ports (and one of the Interrupt Request lines) in order to provide telecommunications services to the Agent security system. It calls the SENDBYTE and BUT PUTCHAR procedures. It handles the low-level details of sending and receiving data during the transmission when it happens.

SENDBYTE:

This procedure attempts to send a bye of data to the referenced serial communications port (a variable containing the port address). This routine is used is in 141, 151.

COMTRANSINIT:

This procedure initializes a transaction between the Agent security system and the modem. A transaction involves sending a string of data 151 to the modem to be sent via telecommunications link to a host server, which after receiving the string of data, in return, sends back a string of data to the client machine 152 containing the Agent security system. The returned string can then be analyzed by the Agent security system to determine what action should be taken next.

COMTRANS:

This procedure handles much of the technical details regarding the maintenance of the transaction between the Agent security system and the host server 129, 134, 135, 143, 144, 145, 152, 157. It is primarily responsible for error handling such as incomplete transactions and stalled transmissions.

COMTRANSCHECK:

Checks the results of a completed transaction between the host server, and the client security system against a table of strings. Three possible outcomes are allowed for:

1. If the incoming data has not been completely received, the carry flag of the client CPU is set (logical 1).

2. If the function timed out (exceeded a time threshold value) and no Agent security system internal string matched the string received from the host server, the carry flag of the client CPU is set, and the AH register is zeroed.

3. If a matching string was found, the carry flag on the client CPU is reset (local 0), and the AL register contains a value that matches the internal table entry.

BUF_FLUSH:

Flushes the internal serial port communications receive buffer on the client machine (containing Agent security system).

The buffer is a circular queue. A circular queue is a data structure that has what is called a head pointer and a tail pointer where the head pointer chases the tail pointer around the queue, never really catching it, but processes each byte of the data stored in it. As a byte of data is received by the serial port, it is latched and must be put into a buffer (an area of memory reserved for this purpose) before the next byte arrives (which overwrites the existing latched byte).

Whenever a communications session starts, it is important that both the input and output buffers are flushed so that all new incoming and outgoing data are not contaminated by old data still sitting in the buffer.

BUF_GETCHAR:

Gets a character from the internal serial port communications receive buffer, removing it from the buffers as it does so.

BUF_PUTCHAR:

Adds a character to the internal serial port communications receive buffer. Increments the head pointer, checking to see if the buffer is full, and setting the carry flag it if it is.

BUF_INC_PTR:

Increments the receive buffer pointer assigned to the client CPU register SI, and wraps it if necessary.

INT2FVECT:

Reserves the required space at the top of conventional memory for the RAM resident portion of the Agent security system. The undocumented Interrupt 21 H, Function 4AH, SubFunction 06 is used to do this.

What is claimed is:

1. A method for monitoring a portable electronic device having a location, comprising:
   determining in a monitoring computer that communication to a portable electronic device should be established;
   preparing a message in the monitoring computer;
   sending the message from the monitoring computer to the portable electronic device;
   silently and invisibly receiving the message in the portable electronic device, wherein the portable electronic device performs a security action based on the message;
   the monitoring computer receiving, from the portable electronic device, information indicating the location of the portable electronic device; and
   the monitoring computer sending said information to one or more of an email inbox, a mobile telephone, a pager and a fax machine.

2. The method of claim 1, further comprising the monitoring computer awaiting establishment of the communication between the monitoring computer and the portable electronic device before sending the message.

3. The method of claim 1, further comprising the monitoring computer initiating a session to communicate with the portable electronic device.

4. The method of claim 1, wherein the monitoring computer determines that the communication should be established if the portable electronic device has been reported to the monitoring computer as being lost or stolen.

5. The method of claim 1, wherein the monitoring computer establishes the communication.

6. The method of claim 1, wherein:
the communication comprises multiple partial communications that are made intermittently, and
the monitoring computer controls one or more of a period of intermittency and a time of establishment of the multiple partial communications.

7. The method of claim 1, wherein the monitoring computer requests establishment of a communication.

8. A server for monitoring portable electronic devices, configured to:
determine that communication should be established with a portable electronic device;
prepare a security message for the portable electronic device if the portable electronic device has been reported to the server as being lost or stolen; and
send the security message to the portable electronic device in a communication that is unapparent to a user of the portable electronic device.

9. The server according to claim 8, further configured to ascertain whether or not the portable electronic device has been reported lost or stolen by accessing a flag corresponding to the portable electronic device.

10. The server according to claim 9, further configured to:
set the flag to indicate whether or not the portable electronic device is lost or stolen; and
set further flags corresponding to further portable electronic devices to indicate whether each of the further portable electronic devices are lost or stolen.

11. The server according to claim 10, wherein each set flag is a serial number of a corresponding lost or stolen portable electronic device in a list of lost or stolen portable electronic devices, and wherein the server is configured to ascertain whether or not the portable electronic device is lost or stolen by comparing a serial number of the portable electronic device with serial numbers in the list.

12. The server according to claim 9, configured to set a secondary flag for the portable electronic device indicating that the portable electronic device has communicated with the server after being reported as lost or stolen.

13. The server according to claim 8, configured to:
receive, from the portable electronic device, unique location information related to the portable electronic device; and
send the unique location information to one or more of an email inbox, a mobile telephone, a pager and a fax machine.

14. The server according to claim 8, configured to:
accept a communication initiated by an agent in the portable electronic device, said communication comprising unique location information related to the portable electronic device; and
send the unique location information to one or more of an email inbox, a mobile telephone, a pager and a fax machine.

15. The server according to claim 8, wherein the communication uses a dedicated communication line between the portable electronic device and the server.

16. The server according to claim 8, configured to receive a serial number of the portable electronic device while communicating with the portable electronic device.

17. The server according to claim 8, configured to communicate with the portable electronic device via one or more of a wire, a wireless medium, a satellite, a cable and a modem.

18. The server according to claim 8, configured to record one or more of date and time of the communication, said date and time being local to the portable electronic device.

19. The server according to claim 8, configured to:
communicate with the portable electronic device using repeated, intermittent, partial communications, and
control one or more of a period of intermittency and a time of establishment of the partial communications.

20. A server for monitoring portable electronic devices, configured to:
determine that a communication should be established with a portable electronic device;
communicate with the portable electronic device in a communication that is unapparent to a user of the portable electronic device;
ascertain whether or not the portable electronic device has been lost or stolen by accessing a flag corresponding to the portable electronic device;
prepare a security message for the portable electronic device if it is lost or stolen; and
send the security message to the portable electronic device.

* * * * *